(12) United States Patent
Seawell et al.

(10) Patent No.: US 10,408,541 B2
(45) Date of Patent: Sep. 10, 2019

(54) HYBRID WET/DRY COOLING TOWER AND IMPROVED FILL MATERIAL FOR COOLING TOWER

(71) Applicant: Composite Cooling Solutions, L.P., Fort Worth, TX (US)

(72) Inventors: Jesse Q. Seawell, Granbury, TX (US); Toby Daley, Fort Worth, TX (US); James A. Bland, Rhome, TX (US)

(73) Assignee: Composite Cooling Solutions, L.P., Fort Worth, TX (US)

( * ) Notice: Subject to any disclaimer, the term of this patent is extended or adjusted under 35 U.S.C. 154(b) by 253 days.

(21) Appl. No.: 15/274,420

(22) Filed: Sep. 23, 2016

(65) Prior Publication Data

US 2017/0108276 A1 Apr. 20, 2017

Related U.S. Application Data

(60) Provisional application No. 62/222,562, filed on Sep. 23, 2015.

(51) Int. Cl.
*F28C 1/14* (2006.01)
*F28F 25/08* (2006.01)
*E04H 5/12* (2006.01)
*F28F 25/02* (2006.01)

(52) U.S. Cl.
CPC .......... *F28C 1/14* (2013.01); *E04H 5/12* (2013.01); *F28F 25/082* (2013.01); *F28C 2001/145* (2013.01); *F28F 25/02* (2013.01)

(58) Field of Classification Search
CPC ........ E04H 5/12; F28C 1/14; F28C 2001/145; F28F 25/02; F28F 25/082

USPC .................. 261/152, 157, 159, 161, DIG. 11
See application file for complete search history.

(56) References Cited

U.S. PATENT DOCUMENTS

| | | | | | |
|---|---|---|---|---|---|
| 3,831,667 | A | * | 8/1974 | Kilgore | F01K 9/003 165/96 |
| 3,923,935 | A | * | 12/1975 | Cates | F28C 1/14 165/111 |
| 3,925,523 | A | * | 12/1975 | Cates | F28C 1/14 261/109 |
| 3,982,914 | A | * | 9/1976 | Grimble | F28C 1/16 96/356 |
| 3,995,689 | A | * | 12/1976 | Cates | F28B 1/06 165/166 |
| 5,349,829 | A | * | 9/1994 | Tsimerman | F24F 5/0035 165/164 |
| 5,944,094 | A | * | 8/1999 | Kinney, Jr. | F28C 1/14 165/166 |

(Continued)

*Primary Examiner* — Charles S Bushey

(57) ABSTRACT

A hybrid wet/dry cooling tower and novel splash fill material are provided. In one embodiment, the cooling tower includes a wet cooling section having a draft fan disposed above the wet section for drawing air through the wet section to cool liquid traversing the wet section. The cooling tower also includes a dry cooling section disposed laterally adjacent the wet section and configured to enable the draft fan to draw air through the dry section. In another embodiment, the dry cooling section has one or more added draft fan(s) for drawing air through the dry section with or without operation of the draft fan disposed above the wet section. In other embodiments, different structures and configurations of plastic splash fill material are described.

19 Claims, 18 Drawing Sheets

(56) References Cited

U.S. PATENT DOCUMENTS

| | | | |
|---|---|---|---|
| 7,510,174 B2* | 3/2009 | Kammerzell | F28C 1/02 |
| | | | 165/166 |
| 7,887,030 B2* | 2/2011 | Hentschel | F28C 1/04 |
| | | | 165/900 |
| 9,091,485 B2* | 7/2015 | Bugler, III | F28C 1/14 |
| 2011/0100593 A1* | 5/2011 | Benz | F28B 1/06 |
| | | | 165/59 |
| 2012/0228787 A1* | 9/2012 | Schreiber | F28C 1/14 |
| | | | 261/153 |

* cited by examiner

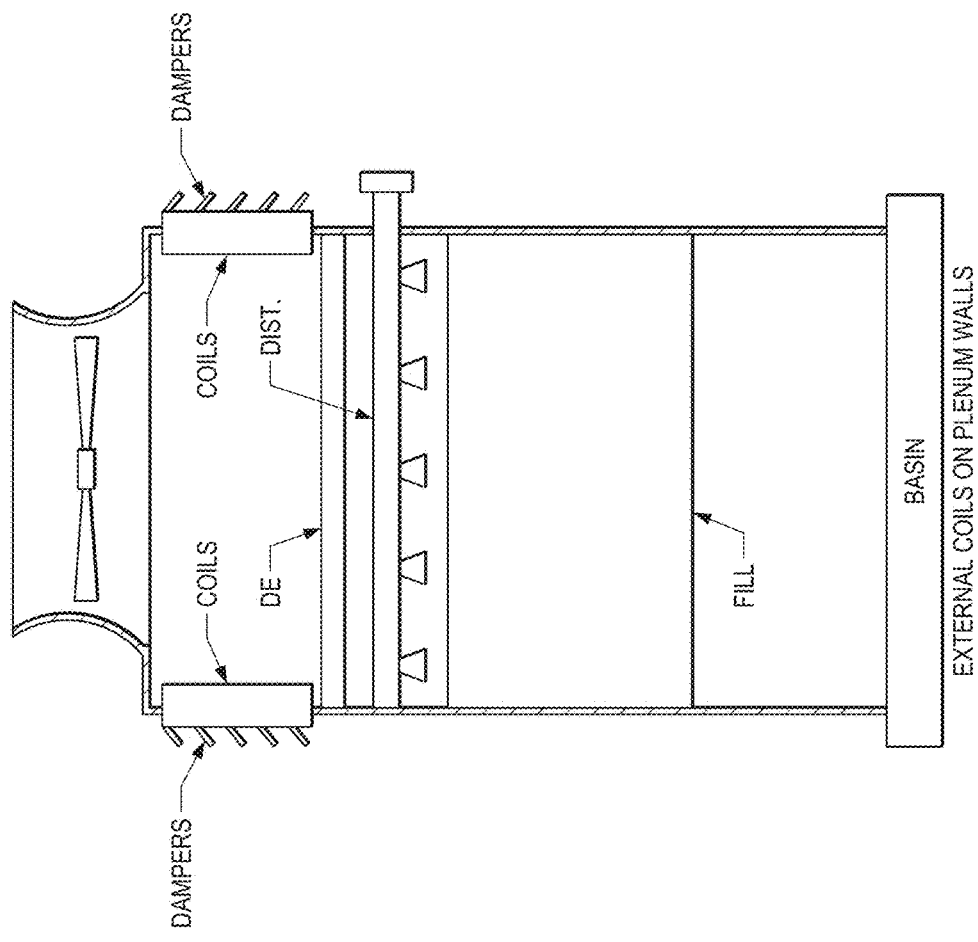
FIG. 7B  EXTERNAL COILS ON PLENUM WALLS
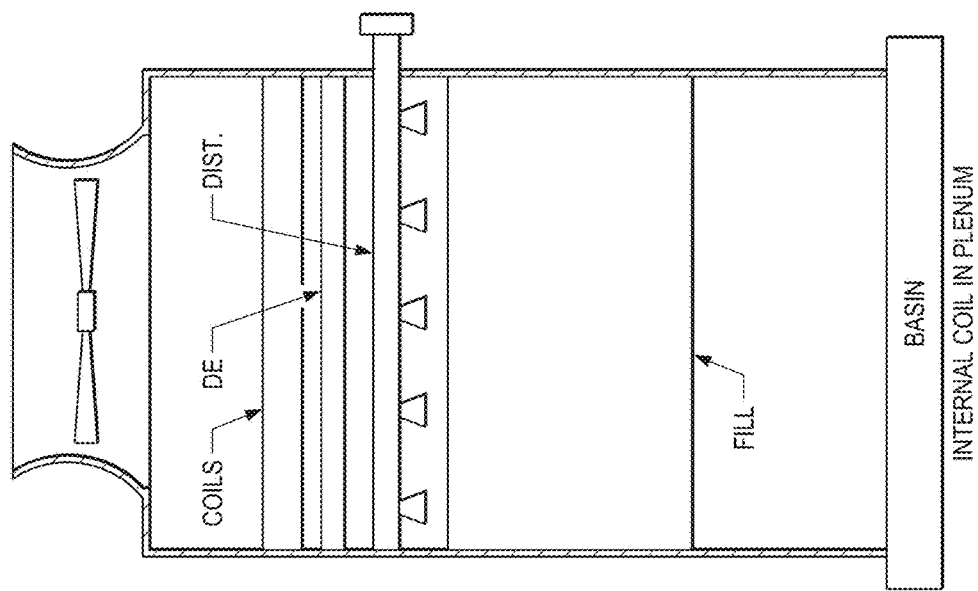
FIG. 7A  INTERNAL COIL IN PLENUM

ID
HYBRID WET/DRY COOLING TOWER AND IMPROVED FILL MATERIAL FOR COOLING TOWER

CROSS-REFERENCE TO RELATED APPLICATION(S) AND CLAIM OF PRIORITY

The present application claims priority under 35 U.S.C. § 119(e) to U.S. Provisional Patent Application No. 62/222,562 filed Sep. 23, 2015, entitled "HYBRID WET/DRY COOLING TOWER AND IMPROVED FILL MATERIAL FOR COOLING TOWER", and which is hereby incorporated by reference into the present application as if fully set forth herein.

TECHNICAL FIELD

The present invention relates to cooling towers and components for building same, and in particular, to a hybrid wet/dry cooling tower and improved fill material(s) for use in a cooling tower.

BACKGROUND

As previously described in U.S. Pat. No. 5,851,446 to Bardo, et al (1998) and U.S. Pat. No. 5,902,522 to Seawell, et al. (1999), of which some portions are reproduced hereinafter, cooling towers are used to cool liquid by contact with air. Many cooling towers are of the counter-flow type, in which the warm liquid is allowed to flow downwardly through the tower and a counter current flow of air is drawn by various means upward through the falling liquid to cool the liquid. Other designs utilize a cross-flow of air, and forced air systems. A common application for liquid cooling towers is for cooling water to dissipate waste heat in electrical generating and process plants and industrial and institutional air-conditioning systems.

Most cooling towers include a tower or frame structure. This structural assembly is provided to support dead and live loads, including air moving equipment such as a fan, motor, gearbox, drive shaft or coupling, liquid distribution equipment, such as distribution headers and spray nozzles, and heat transfer surface media such as a fill assembly. The fill assembly material generally has spaces through which the liquid flows downwardly and the air flows upwardly to provide heat and mass transfer between the liquid and the air. Different types of fill materials, e.g., stacked layers of open-celled clay tiles, are commercially available, depending on the desired design and operating characteristics. This fill material is heavy, and can weigh in excess of 50,000 pounds for a conventional size air conditioning cooling tower. As such, the tower frame/structure and other structural parts of a cooling tower must not only support the weight of the fill material and other components, but must also resist wind forces or loads and should be designed to withstand earthquake loads.

Due to the corrosive nature of the great volumes of air and water drawn through such cooling towers, it has been the past practice to either assemble such cooling towers of stainless steel or galvanized and coated metal, or for larger field assembled towers, to construct such cooling towers of wood, which is chemically treated under pressure, or concrete at least for the structural parts of the tower, or combination of these materials.

Metal structures and parts of cooling towers can be corroded by the local atmosphere or the liquid that is being cooled, depending on the actual metal used and the coating material used to protect the metal. Further, such metal towers are usually limited in size and are also somewhat expensive, especially in very large applications such as for cooling water from an electric power generating station condenser. Concrete is very durable, but towers made of concrete are expensive and heavy. Many cooling towers are located on roofs of buildings, and the weight of a concrete cooling tower can present building design problems. Plastic parts are resistant to corrosion, but prior plastic parts ordinarily would not provide enough strength to support the fill material and the weight of the tower itself.

Wood has been used for the structural parts of cooling towers, but wood also has its disadvantages. Wood towers may require expensive fire protection systems. The wood may decay under the constant exposure not only to the environment, but also to the hot water being cooled in the tower. Wood that has been chemically treated to increase the useful life may have environmental disadvantages: the chemical treatment may leach from the wood into the water being cooled. Fiber reinforced plastic has been used as a successful design alternative to wood and metal.

Within the last decade or so, prior art solutions began using fiber reinforced plastic beams and columns including those shown in U.S. Pat. No. 5,236,625 to Bardo (1993) and U.S. Pat. No. 5,028,357 to Bardo (1991), both of which are incorporated herein by reference. Both patents disclose prior art structures for cooling towers. Thus, while these prior fiber-reinforced plastic tower structures have solved many of the problems associated with wood and metal cooling tower structures, the solutions to the problem of resistance to lateral loading have increased the costs of these units. Both the shear wall and laterally braced frames can be labor intensive to build, since there are many parts and many connections to be made. With these prior art solutions, there exist a large number of key structural elements, with more complex manufacturing and inventorying of parts, increasing the complexity of construction, and therefore the costs.

As such, a need existed for a lower cost cooling tower structure, and for lower cost cooling tower structures that meet less exacting design criteria. Further, in those fiber reinforced plastic frame structures at the time, one difficulty with the joint between the columns and beams was that when constructed with conventional bolts or screws, the beams and columns could rotate with respect to each other. When tighter connections were attempted to be made with conventional bolts or screws to limit the rotation and provide lateral stability without adding diagonal bracing, the fiber reinforced plastic material could be damaged, and the problem worsened as the connecting members might degrade the fiber reinforced plastic and enlarge the holes in which they are received.

Some of the problems of these prior art systems were alleviated or reduced with new fiber reinforced cooling tower systems and methods of construction as described in U.S. Pat. No. 5,851,446 to Bardo (1998) and U.S. Pat. No. 5,902,522 to Seawell (1999), both of which are incorporated herein by reference. As described therein, the fiber-reinforced plastic (FRP) beams and columns were connected using mounting plates and bonding adhesive. As noted in these patents, one advantage of this prior art system allows a theoretical increase in the size of the bays, instead of the standard bay with columns spaced apart a distance of six feet, such bays arguably can be increased to provide bays with up to twelve feet between columns. However, the use of mounting plates and bonding adhesive increases the number of components, time and expense in assembling the structure. Moreover, larger bays constructed in accordance with prior art structures may be unlikely to meet the design criteria necessary to support the cooling tower components and structures, unless larger, stronger and more costly components are utilized.

Accordingly, a cooling tower and tower/frame structure having fewer beams and columns, and fewer overall components, that reduced costs and time to assemble, has been developed, such as that described in U.S. Pat. No. 7,275,734, which is incorporated herein by reference.

Another problem with prior art cooling towers is the type of cooling employed to cool the liquid is limited to either "wet cooling" or "dry cooling". In wet cooling, the liquid is cooled by direct contact with the air flow. In dry cooling, the liquid is cooled by the air flowing across a thermally conductive heat exchanger (e.g., coils) that carries the liquid. Normally, cooling towers employ either wet cooling or drying cooling, but not both. Under certain operating and environmental conditions, wet cooling towers can emit a visible plume (caused by evaporation of the liquid). These visible plumes are undesirable for several reasons. Thus, cooling towers have been recently designed to provide "plume abatement"—which is the reduction or elimination of the visible plume. To accomplish this, manufacturers of wet cooling towers have incorporated technology which dries the air and reduces/eliminates the plume. A wet cooling tower with plume abatement technology has been referred to as a "hybrid cooling tower." In these towers, features and components normally used in drying cooling are utilized for the limited purpose of plume abatement (i.e., drying the saturated air to reduce/eliminate the visible plume).

Accordingly, there is needed a new cooling tower design that utilizes both dry and wet cooling structures and techniques in which the cooling mode may be dry cooling only, wet cooling only, or a combination of dry and wet cooling. In addition, the combination of dry and wet cooling allows for plume abatement when necessary or desirable.

Still another problem with prior art cooling towers is the fill material. Different types of fill materials, e.g., stacked layers of open-celled clay tiles, are commercially available, depending on the desired design and operating characteristics. The specific shape and composition of different fill materials may result in less or more cooling capacity and efficiencies. Accordingly, there is needed a fill material having different shape(s) and/or composition(s) to improve cooling tower performance.

SUMMARY

In accordance with one aspect of the present disclosure, there is provide a cooling tower having a support frame structure defining a first interior volume and a second interior volume, and a fluid distribution system configured to distribute fluid within the first and second interior volumes defined by the support frame. The cooling tower further includes a wet cooling section associated with the first interior volume, wherein the wet cooling section includes heat transfer material disposed within the first interior volume defined by the support frame for receiving fluid from the fluid distribution system, and first air moving equipment for causing air to move around the heat transfer material. The cooling tower also includes a dry cooling section associated with the second interior volume and disposed laterally adjacent the wet cooling section, the dry cooling section comprising coils for receiving fluid from the fluid distribution system.

In accordance with another aspect of the present disclosure, there is provide a cooling tower having a support frame structure defining a first interior volume and a second interior volume, and a fluid a fluid distribution system to distribute fluid within the first and second interior volumes defined by the support frame. The cooling tower includes a wet cooling section associated with the first interior volume, and the wet cooling section includes heat transfer material within the first interior volume defined by the support frame for receiving fluid from the fluid distribution system. The cooling tower further includes a dry cooling section associated with the second interior volume and disposed laterally adjacent the wet cooling section, where the dry cooling section includes a first set of coils disposed laterally adjacent a first side of the wet cooling section and for receiving fluid from the fluid distribution system, and a second set of coils disposed laterally adjacent a second side of the wet cooling section and for receiving fluid from the fluid distribution system. Air moving equipment is included for causing air to move around at least a one of the heat transfer material, the first set of coils and the second set of coils.

In yet another embodiment, there is provided cooling tower fill material, or a splash bar, having a rectangular splash bar body in a form of a lattice structure having a plurality of openings formed therethrough, the splash bar body defining a hollow passageway extending therethrough in a lengthwise direction. The splash bar body further includes a top portion having a mesh structure with a first grid pattern, a bottom portion having a mesh structure with a second grid pattern and disposed generally opposite the top portion, a pair of opposing side portions interconnecting respective ones of the bottom and top portions, and the top mesh surface structure of the top portion is generally concave and arcuate-shaped. The first grid pattern of the top portion is offset from second grid pattern of the bottom portion.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 7A and 7B are diagrams illustrating two basic prior art plume abatement wet cooling towers;

DETAILED DESCRIPTION

A prior art cooling tower and frame structure is described in U.S. Pat. No. 5,902,552 to Seawell (1999), which has been previously incorporated herein by reference.

Figure 1A:
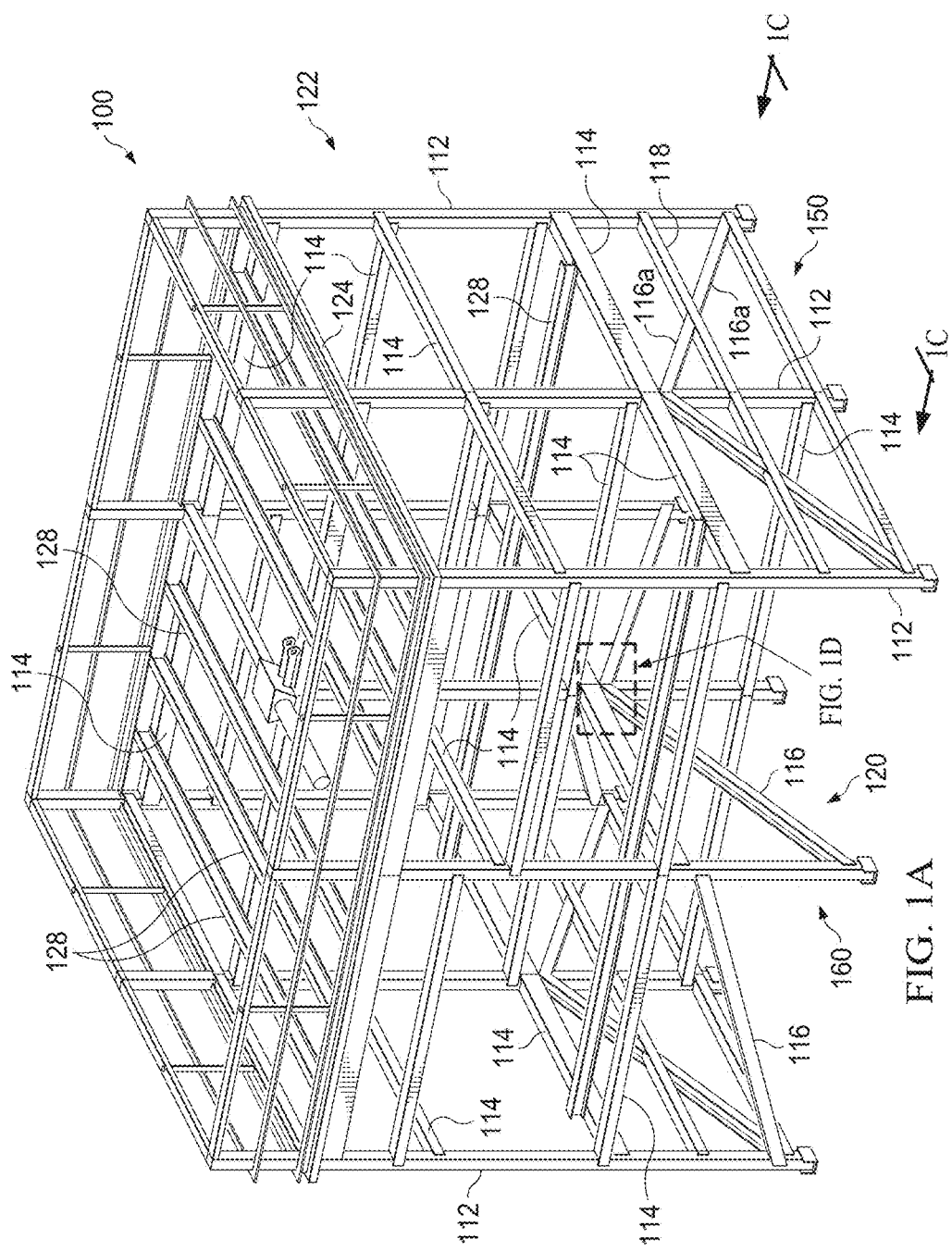
FIG. 1A is a perspective view of a tower/frame structure in accordance with the present disclosure.

Now referring to FIG. 1A, there is shown a tower/frame structure generally designated 100, in accordance with the present disclosure, that includes a plurality of vertical columns 112 and a plurality of horizontal beams 114. Diagonal bracing members 116 are included to provide lateral stability and resistance to wind and earthquakes. Additional diagonal bracing members 116a and beams 118 are provided for additional stability, and may be optional, depending on the desired load characteristics and criteria. The term "beam" as used herein, refers to the beams 114 and also to the bracing members 116, 116a. As will be appreciated, the structure 100 is shown generally including the structural support members of a tower structure intended to support additional components or materials.

In the embodiment shown, the columns 112 are spaced a predetermined distance to provide bays. The column spacing distances may be the same or different, thus different embodiments may have different sized bays having footprints that are square or rectangle. In different embodiments, the spacing between columns 112 can be any distance, and usually ranges between eight and twenty feet, and more particularly between twelve and eighteen feet, and in one embodiment is about twelve feet or greater, and preferably between fourteen to sixteen feet. The structure 100 has several tiers or levels, including an air inlet level 120 and upper levels 122. Further, the distance between each level may be different or the same, as desired.

When used in a cooling tower, the upper levels 122 carry fill material, a water distribution system and air intake equipment and/or other components (not shown in FIG. 1A).

In a counterflow cooling tower, a large diameter fan and motor (not shown in FIG. 1A) are mounted on a roof 124 to draw air from air intake level 120 and through the upper levels 122 to exit. As will be understood, the structure 100 and other elements and components described herein, are not limited to use in a cooling tower, but may be used as, and in, a structural frame to support any type of equipment or components or for any purpose or building structure. Moreover, FIG. 1A illustrates but one example of the structure 100 having four bays. Additional bays and configurations may be included, as desired.

Additional joist members 128 rest on one or more beams 114 and function to support a floor or the other components at desired levels of the structure 100.

Figure 1B:
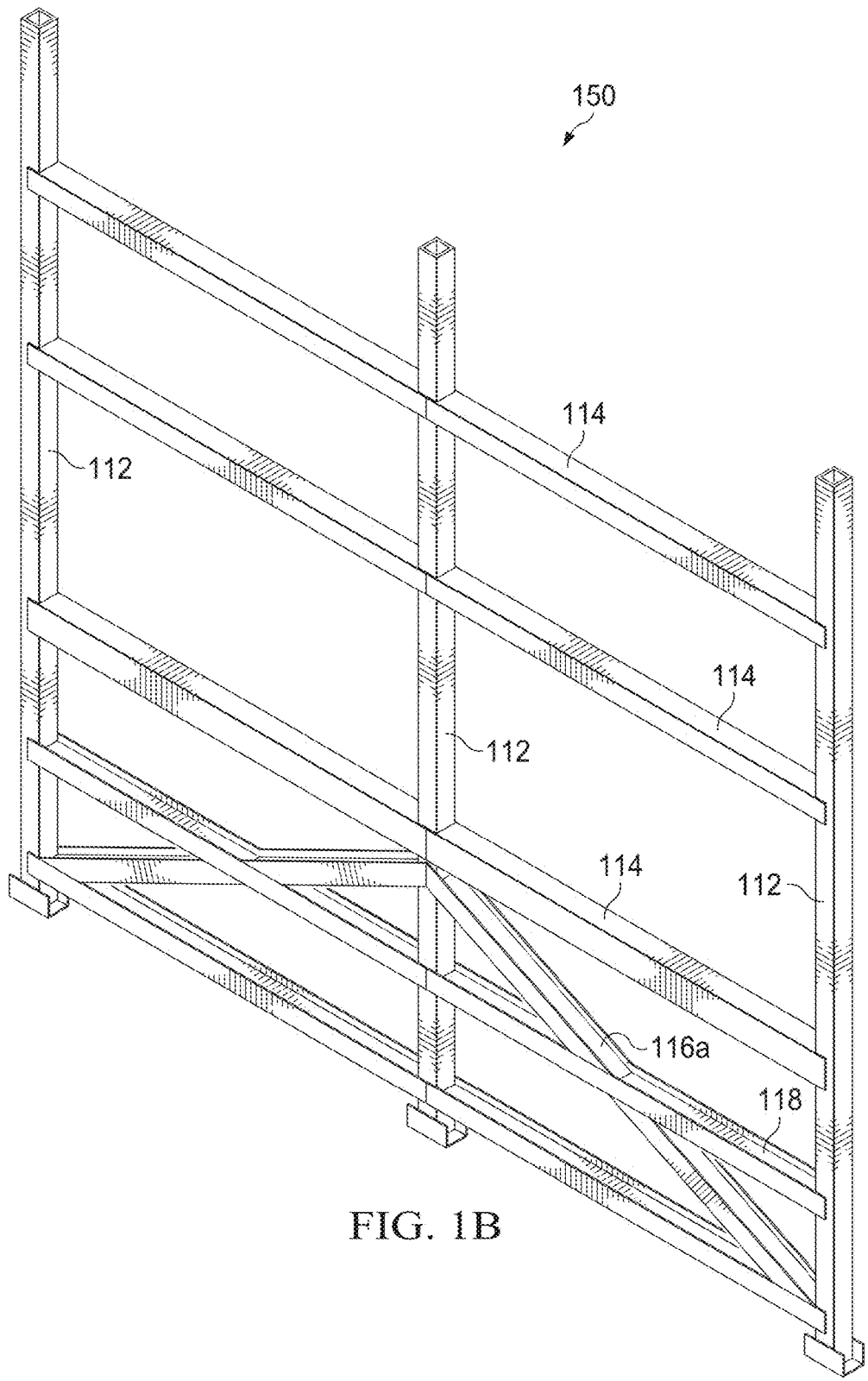
FIGS. 1B and 1C illustrate a first bent line (along B-B of FIG. 1A) of the structure 100 and a second bent line 160 (along B-B of FIG. 1A with the first bent line 150 removed)
Figure 1C:
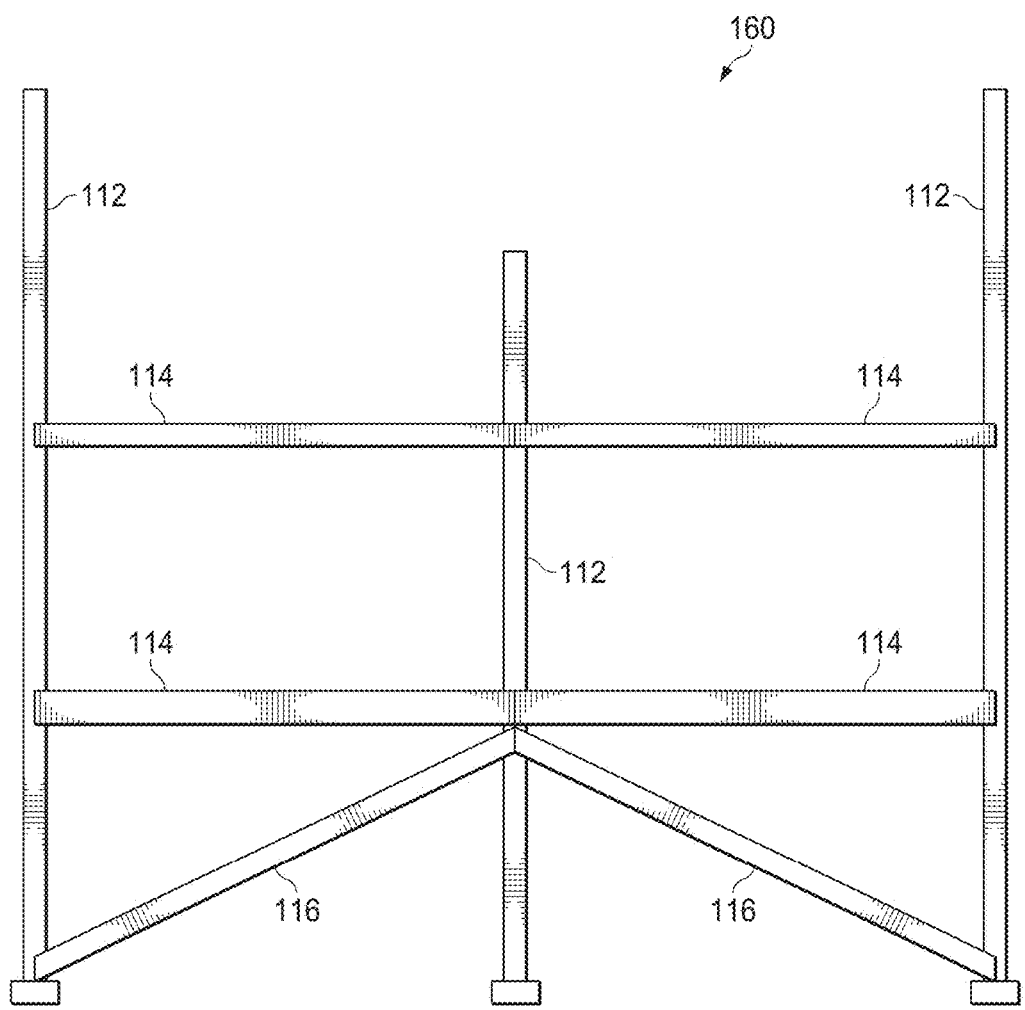

Now referring to FIGS. 1B and 1C, there is shown a first bent line 150 (along B-B of FIG. 1A) of the structure 100 and a second bent line 160 (along B-B of FIG. 1A with the first bent line 150 removed). As the structure 100 is illustrated with four bays, there are three bent lines (two outer and one inner bent lines). As shown, the center column 112 of the bent line 160 is shorter than the outer most columns, as the extra length of the outermost columns is utilized as a post for a fence erected around the roof 124 of the structure 100.

One significant advantage of the present invention is found during construction of the tower frame/structure. Once two bent lines (such as bent lines 150 and 160) are erected and a set of cross beams (or members) is in place, using the columns, beams and connections disclosed herein, the structure has substantial load carrying capability at most or all points along the beams and columns. This provides a high standard of fall protection for workers during construction of the remaining structure. For example, workers may utilize retractable safety lines for anchoring at one of many possible attachment points. Workers may then move about the structure without having to re-anchor the safety line before moving to another location. In most designs in accordance with the invention taught herein, it is likely that this structure will meet or exceed United States OSHA standards (5000 lb. attachment or anchor point loads) for fall protection.

Figure 1D:
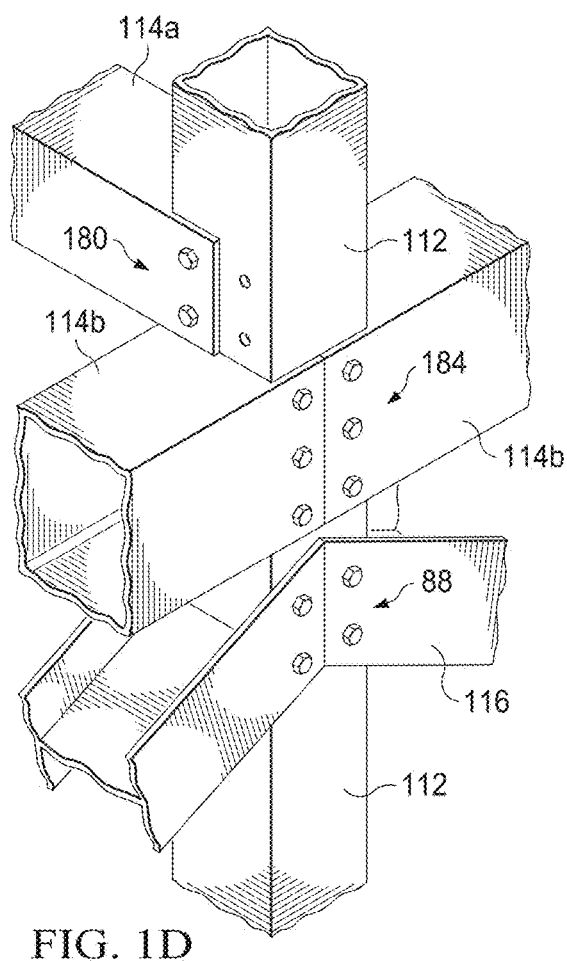
FIG. 1D illustrates several connections or anchor points between a column and the beams and diagonal brace members.

Now referring to FIG. 1D (showing a close-up of Detail A of FIG. 1A), there are illustrated several connections or anchor points 180, 182, 184, 186, 188 between a column 112 and the beams 114a, 114b, 114c and diagonal brace members 116. The column 112 includes a plurality of attachment holes therein, while each of the beams 114a, 114b, 114c and diagonal brace members 116 have one or more attachment holes for alignment with corresponding holes in the column 112. Once aligned, a fastener (not shown in FIG. 1D) is inserted into the aligned holes to connect the respective beam or member to the column 112.

As will be appreciated, the fastener may include any type of mechanical fastener known to those of ordinary skill in the art, including bolts, screws and pins, and constructed of any suitable material suitable for the structure 100 application (e.g., non-corrosive such as galvanized or stainless, if used in a cooling tower application). The attachment holes in each of the column 112, beams 114a, 114b and 114c and the members 116 are shown as pre-formed or pre-drilled. These may be formed any time prior to the assembly of the connections 180, 182, 184, 186, 188, and further may formed at the time of assembly of the connections. In one embodiment, a pin is utilized as the fastener, in conjunction with the novel design aspects of the column 112, beams 114, members 116, 118 and the connections and connecting mechanism (as shown in FIG. 1D). As such, in this embodiment, a fastener with a tightening function may not be necessary as a connection pin will usually carry the necessary load and provide moment stability (and as further described below).

Figure 2A:
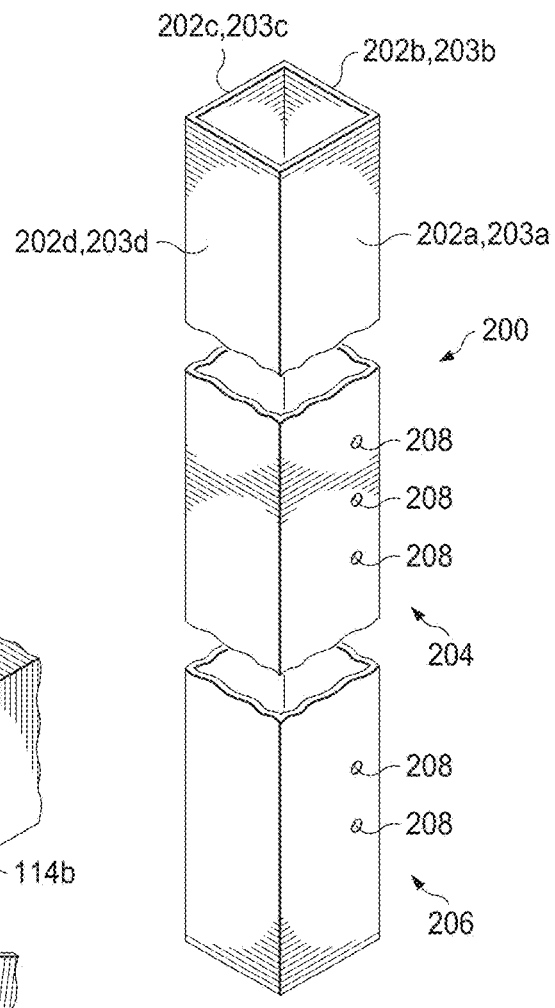
FIGS. 2A and 2B illustrate a perspective view (FIG. 2A) and a side cross-sectional view (FIG. 2B) of a column in accordance with present invention.
Figure 2B:
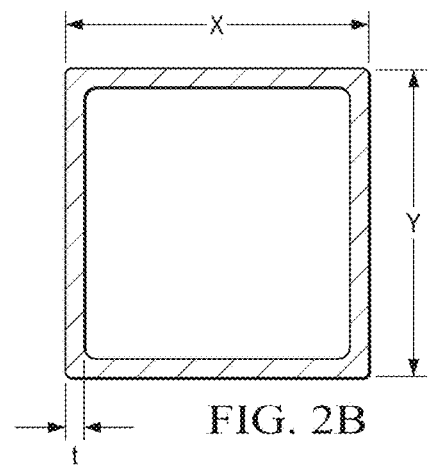

Now referring to FIGS. 2A and 2B, there is provided a perspective view (FIG. 2A) and a side cross-sectional view (FIG. 2B) of a column 112 and designated using the reference numeral 200, in accordance with present invention. The column 200 has four sides 202a, 202b, 202c, 203d (each side having a surface), with each side having a respective sidewall 203a, 203b, 203c and 203d. As shown, the cross-sectional shape of the column 200 is square. Other rectangular shapes may be used. The sides and sidewalls have outer dimensions X and Y (as shown in FIG. 2B), these may also be referred to as cross-sectional dimensions. (The references X and Y do not necessarily reflect the x and y directions in an xyz coordinate system, but are used for reference only.)

As illustrated, the column 200 is substantially hollow (though the column 200 may include inner walls for additional strength, if desired). Each sidewall has a thickness t. In one embodiment, the thickness t is substantially the same for each sidewall. In other embodiments, the thickness t may be the same for each sidewall in a pair of respective opposing sidewalls (and different among the two pairs), or different for each sidewall.

The dimensions X and Y may be chosen as desired, and may further be different from each other (rectangular) or substantially the same (square). As will be appreciated, it may be beneficial for the column 200 to be square (dimension X equals dimension Y) to allow the beams and members connected thereto to utilize a standard length flange or extension (of any beam) for the connection. In one specific embodiment, X and Y are approximately 6 inches, and the thickness t is approximately ⅜ inch. In another embodiment, both X and Y are about 4 inches or greater. Other dimensions may be used. Dimensions X and/or Y reflect the outside dimension (OD) of a given cross-section, as the case may be, of the column 200.

The length of the column 200 is generally equal to the desired height of the structure 100 (with some columns shorter or longer than others, as per design). In one embodiment, the column 200 is a single, unitary piece, with lengths ranging from ten to seventy feet. In other embodiments, depending on the desired height of the structure 100 and other deign considerations, the column 200 may be constructed from two or more pieces that are connected or spliced together.

Column 200 may be constructed from wood, steel or other metal, or fiber-reinforced plastic (FRP) or other composite materials.

The column 200 includes one or more sets 204, 206 of attachment holes, apertures or openings 208 (hereinafter referred to as "holes"), with each set including one or more pairs of attachment holes 208. A particular set 204, 206 of attachment holes 208 are formed through one of the sidewalls and its respective opposite sidewall, thus a pair of corresponding attachment holes (one located on one sidewall and the other on the opposite sidewall) are operable for receiving a fastener therethrough both aligned holes. When inserted, the fastener extends through the entire cross-section of the column 200. Each set 204, 206 of attachment holes 208 corresponds to another set of attachment holes 208 (not shown) in one of the beams 114, 116, 118 that are to be connected/attached to the column 200 (i.e., column 112).

The location (height) of the attachment holes 208 along the column 200 depends on the location of the desired connection point with a particular beam. The number of attachment holes 208 per connection (column-beam connection) may be chosen as desired, and may include one, two, three, four or more holes (as desired and/or depending on the size and shape of the particular beam). The attachment holes 208 may be formed by a suitable process or fabrication method, such as by any drilling or cutting method (or other material removal means) and the like. As noted above, the holes may be formed during the actual erection of the structure 100, but may be advantageously pre-formed at some point prior to construction (such as during the column fabrication process or shortly thereafter).

Each set 204, 206 of attachment holes 208 (in sidewalls 203a and 203c) for a particular column-beam connection is positioned closer (or nearer) to one of the sidewalls 203b than the other sidewall 203d, as shown. This advantageously allows for another beam placement and column-beam connection (via attachment holes through sidewalls 203a and 203c but nearer the sidewall 202d, not shown) to be made on the opposite side (180 degrees) of the column 200 (e.g., see FIG. 1D and connection points 182 and 184 for beams 114b). In one specific embodiment, the sets of attachment holes 204, 206 are laterally spaced from the sidewall 202b approximately one inch and laterally spaced more than one inch from the sidewall 202d), and the diameter/dimension of the holes is about ½ inch. Other lateral spacings and attachment hole diameters/dimensions may be utilized, including centering the set of attachment holes (in the event that no additional column/beam connection will be made at that vertical height). As will be appreciated, the attachment holes 208 as shown are circular, but may other shapes, e.g., slotted, square, rectangle, oval, etc., if desired.

Additionally, the positioning of the particular attachment holes 208 to a sidewall (closer to one of the sidewalls than the mid-point of the column 200 where a beam will extend outward from that particular sidewall) helps reduce or eliminate "creep." In prior art systems, the fasteners are tightened to increase moment resistance of the connection. Since connection points always generally become loose due to wear, there is a desire to tighten the fasteners as tight as possible to ensure moment resistance. However, when fasteners are placed in the midpoint of a hollow FRP column, there is an opportunity to overtighten the fastener and the FRP structure. As such, crush-resistant sleeves are typically utilized. It has been determined by the inventors, that when the position of the fastener is closer to the sidewall than the midpoint, tightness of the connection is not as critical because, a connection in accordance with the present invention, provides sufficient moment resistance without the need for substantial tightening of the fastener about the connection point that might result in crushing the column 200. Thus, tightening needs are significantly reduced, thus eliminating any sleeves or plates. It has been determined that pins may be utilized as the fasteners, however, for safety and cost reasons, standard bolts or screws may be more advantageous.

Figure 2C:
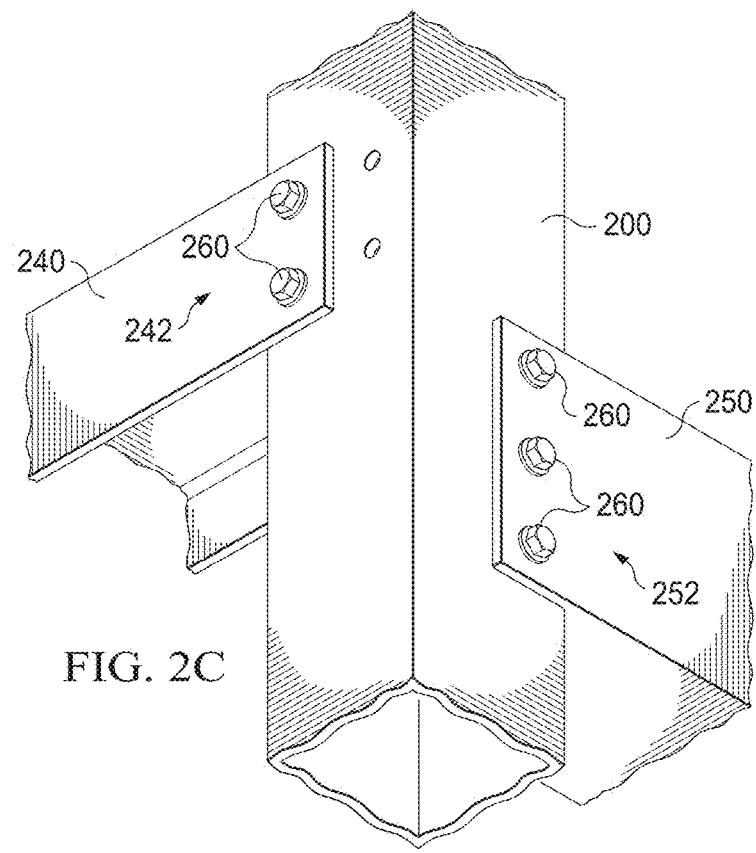
FIG. 2C shows one example of a vertical column and connected first and second beams 300.

Now referring to FIG. 2C, there is shown one example of the vertical column 200 having a first horizontal beam 240 and a second horizontal beam 250 connected. The first beam 240 is connected at a first location along the column 200 and the second beam 250 is connected at a second location along the column 200. Each connection includes a set of attachment holes 242, 252 and plurality of fasteners 260 extending through the respective attachment holes 242, 252 and thus through the respective beam 240, 250 and the column 200. As shown, an additional set of attachment holes is provided to allow another column-beam connection of another beam (not shown) extending from the column 200 along the same plane as the beam 240. Other configurations are possible, and that shown in FIG. 2C is one example.

Figure 3A:
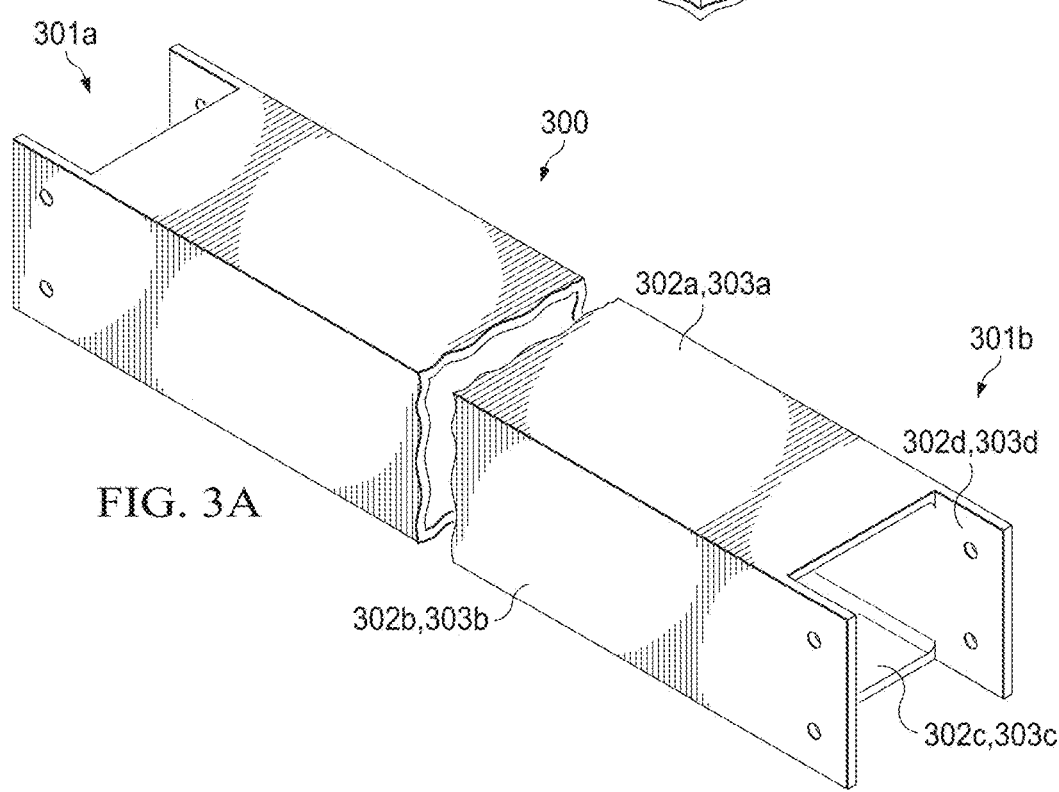
FIGS. 3A, 3B, 3C, 3D and 3E illustrate a perspective view (FIG. 3A), a detailed perspective view of one end (FIG. 3B), a first and second embodiment of side cross-sectional views (FIGS. 3C and 3D), and a top/side view of one end (FIG. 3E), all of a beam in accordance with the present disclosure.
Figure 3B:
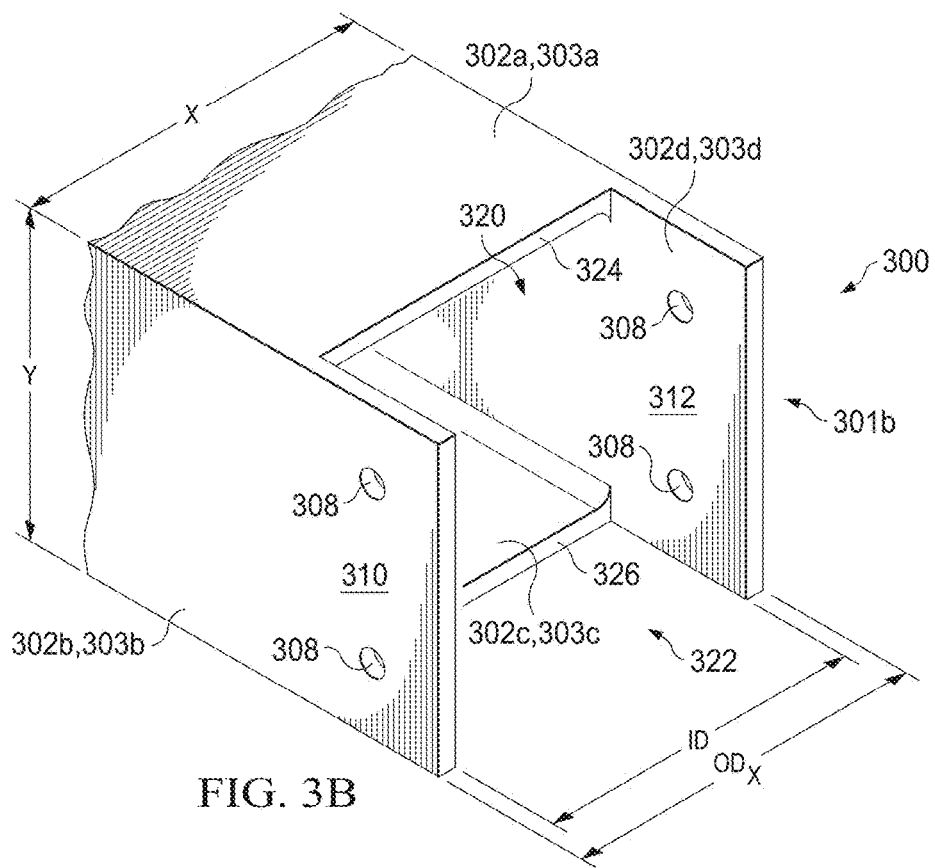
Figure 3C:
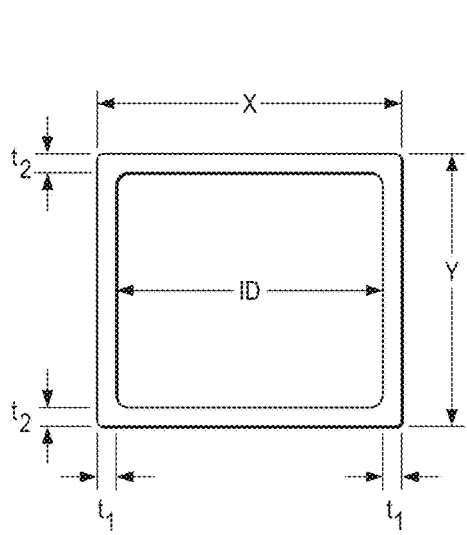
Figure 3D:
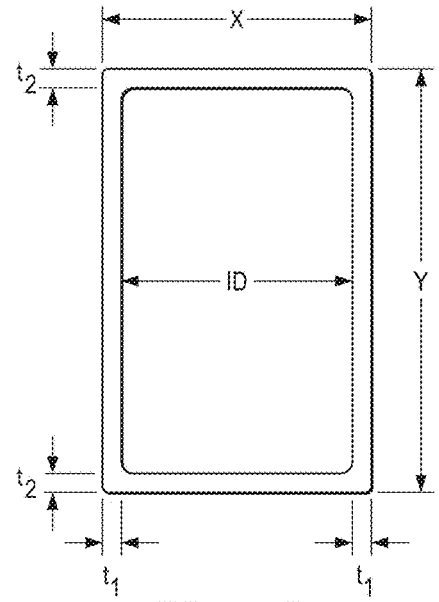

Now referring to FIGS. 3A, 3B, 3C, 3D and 3E there are shown a perspective view, a detailed perspective view of one end (FIG. 3B), a first and second embodiment of side cross-sectional views (FIGS. 3C and 3D), and a top/side view of one end (FIG. 3E) of a beam 114 and which is designated using the reference numeral 300, in accordance with present invention. The elongated beam 300 includes a first end 301*a* and a second end 301*b*, and further includes four sides 302*a*, 302*b*, 302*c*, 302*d* (each side having a surface), with each side having a respective sidewall 303*a*, 303*b*, 303*c* and 303*d*. As shown, the cross-sectional shapes of the two embodiments (FIGS. 3C and 3D) are rectangular, and may be square. Other rectangular shapes may be used. The sides and sidewalls have outer dimensions X and Y (as shown in FIGS. 3B, 3C and 3D).

Now turning specifically to FIG. 3B, one of the ends 301*a*, 301*b* of the beam 300 is shown. At the end, one side and sidewall 302*b*, 303*b* includes a first connection extension, tab or flange 310, and the opposing side and sidewall 302*d*, 303*b* includes a second connection extension, tab or flange 312. The extensions 310, 312 extend further outward than the adjacent sides and sidewalls (302*a*, 303*a* and 302*c*, 303*c*) thus forming a C-shaped end for the beam 300. The distance between the inner walls of the flange 310 and the flange 312 is referred to as an inner dimension (ID) while the distance between the outer walls is the outer dimension (OD). In one specific embodiment, the beam 300 is formed with a flush end (i.e., all sidewalls extend the same length), and material from the areas 320 and 322 is cut out or removed to form the C-shaped end, thus forming the extensions or flanges 310, 312.

The connection extensions or flanges 310, 312 provide, in essence, an integrally formed connection or mounting plate, are integrally formed with the rest of the beam 300, and operable to be positioned adjacent to the sidewalls of the column 200 and mounted to the outside of the column 200. Each of the connection extensions or flanges 310, 312 provide an area that is positioned adjacent a sidewall area of the column 200.

The extensions or flanges 310 and 312 are integrally formed, as well as unitary, with the sidewalls 303*b* and 303*d*, respectively.

The connection extensions 310 and 312 each include one or more attachment holes, apertures or openings 308 (hereinafter referred to as "holes"). The attachment holes 308 are formed through one connection extension 310 and corresponding attachment holes 308 are formed through the other connection extensions 312, and are operable for receiving a fastener therethrough both aligned holes. When inserted, the fastener extends through the entire cross-section of the beam 300. As will be appreciated, the attachment holes 308 correspond to another set of attachment holes 208 in the column 200 or in another beam (not shown).

As illustrated in FIGS. 3B, 3C and 3D, the beam 300 is substantially hollow (though the beam 300 may include inner walls for additional strength, if desired). As shown in FIGS. 3C and 3D, each sidewall has a thickness t1 or t2. In one embodiment, the thickness t is substantially the same for all sidewalls (t1 equals t2). In other embodiments, the two opposing sidewalls may have the same thickness (t1 or t2), or each sidewall may have a different thickness dimension.

The dimensions X and Y may be chosen as desired, and may further be different from each other (providing a rectangular shape) or substantially the same (square). In one specific embodiment shown in FIG. 3C, the approximate dimensions are: X (or OD)=6.56 inches, Y=6.0 inches, t1=0.25 inch, and t2=0.375 inch, resulting in the inner dimension (ID) between the flanges of approximately ID=6.062 inch (such beam is referred to as a "tie beam"). In another specific embodiment shown in FIG. 3D, the approximate dimensions are: X=6.75 inches, Y=10.0 inches, t1=0.3 inch, and t2=0.5 inch, resulting in the inner dimension (ID) between the flanges of approximately ID=6.125 inch (such beam is referred to as a "light beam"). In yet another specific embodiment (not shown) the approximate dimensions are: X=6.75 inches, Y=11.0 inches, t1=0.3 inch, and t2=0.5 inch, resulting in the inner dimension (ID) between the flanges of approximately ID=6.125 inch (such beam is referred to as a "medium beam"). As will be appreciated, other X and Y dimensions and thickness t1 and t2 may be used, as desired. In another embodiment, both X and Y are at least four inches or greater. Dimensions X and/or Y reflect the outside dimension (OD) of a given cross-section, as the case may be, of the beam 300.

It will be understood that it is advantageous, and one aspect of the present invention is, to have the inner dimension (ID) (cross-section) between the flanges 310, 312 of the beam 300 to be substantially equal to (or slightly larger, given construction requirements and tolerances) the outer dimension (X or Y) of the column 200. Due to the thickness aspect of the beam 300, this results in the outer dimension (X) (measured between the outside walls of the sidewalls incorporating the flanges) of the beam 300 to be slightly larger than the column (or beam) to which it will attach/couple. As such, the columns and beams of the present invention are specifically designed to provide the necessary column-beam (or beam-beam) connection without any additional sleeves, plates, or spacers.

For example, when the outer dimension (OD) (the X or Y dimension) of the column 200 is equal to X inches, the inner dimension (ID) of the beam 300 should also be approximately X inches. Advantageously, it should be X plus a tolerance distance (small) to allow the C-shaped section of the beam 300 to be set in place around the column 200. Such tolerance distance may be in the range from zero to 0.5 inches, and more particularly is less than about 0.25 inch, and may be even smaller. Accordingly, the ID of the beam 300 is approximately equal to, or slightly larger than, the OD of the column 200 measured at the locations where the beam 300 and the column 200 attach to each other. This may also apply to the connection of two beams (where the ID of one beam is approximately the same, or slightly larger than, the OD of the other beam if two beams are attached).

Figure 3E:
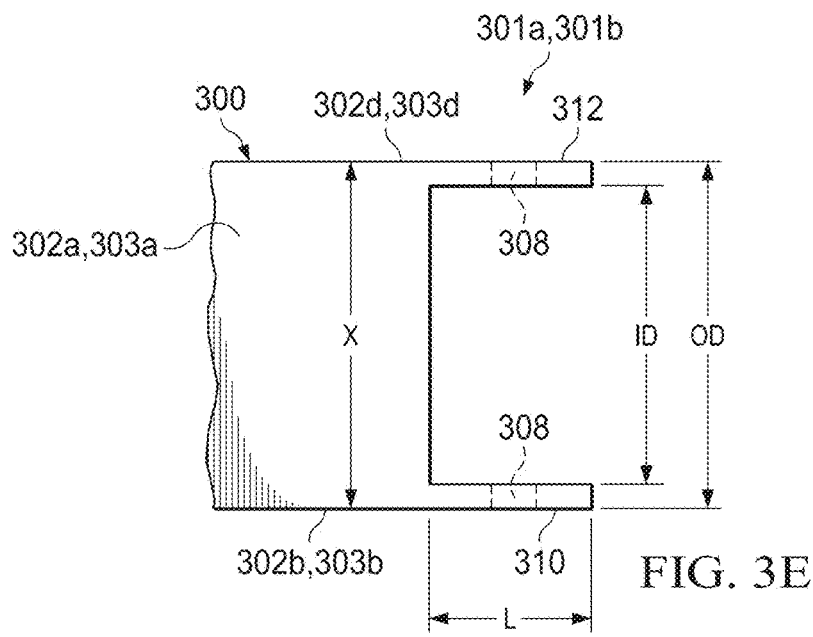
Figure 3F:
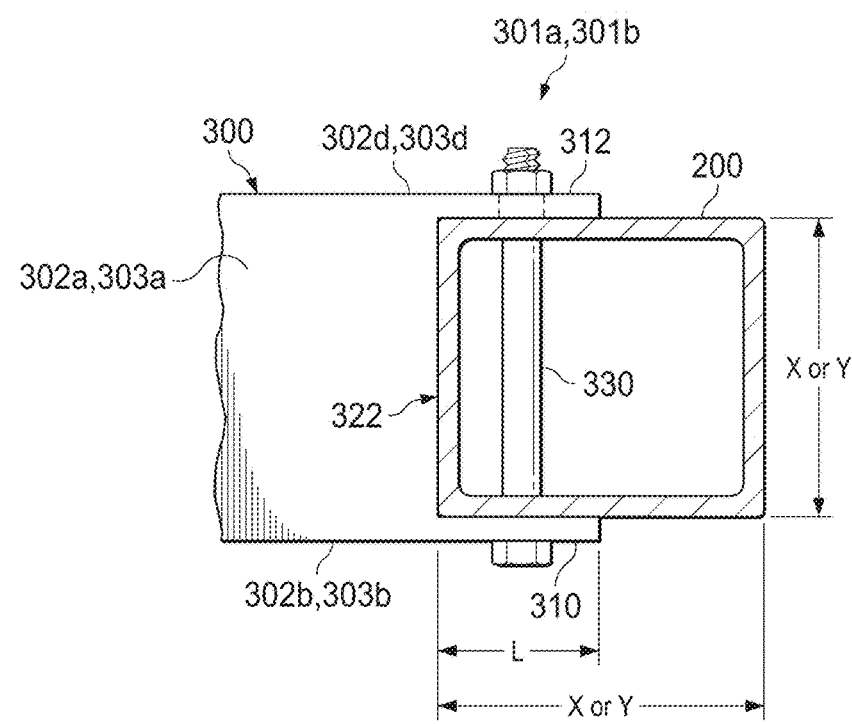
FIG. 3F shows a top view of a beam connected to a column (or a side view of a beam connected to another beam)

Now referring to FIGS. 3E and 3F, there is shown a top/side view of one end 301*a*, 301*b* of the beam 300 prior to connection to the column 200 and a top/side view after connection. As will be appreciated, given the design criteria, one end or both ends of the beam 300 may include the connection extensions or flanges, as described herein. Attachment holes 308 in the flanges 310, 312 are shown with dotted lines. Each of the flanges 310, 312 extend a length L from an outer edge 324 or 326 of an adjacent sidewall 303*a* or 303*c*. The lengths L for each flange may be different, but are usually the same.

The length L is of a length to provide an overlap of the flanges 310, 312 with the outer sides and sidewalls 202, 203 of the column 200 to enable adequate connection of the beam to the column. A small gap, identified by reference numeral 332, will usually exist between edges 324, 326 of the beam sidewalls 303*a*, 303*c*. The size of the gap 332 and the amount of overlap desired will determine the suitable length L. It will be understood that the location of the attachment holes will also play a factor in determining the overall positioning. In one embodiment, regardless of the size of the gap 332, the length L may be approximately equal to or greater than one-half the outer dimension (X or Y, as shown) of the column 200 (or beam).

Figure 3G:
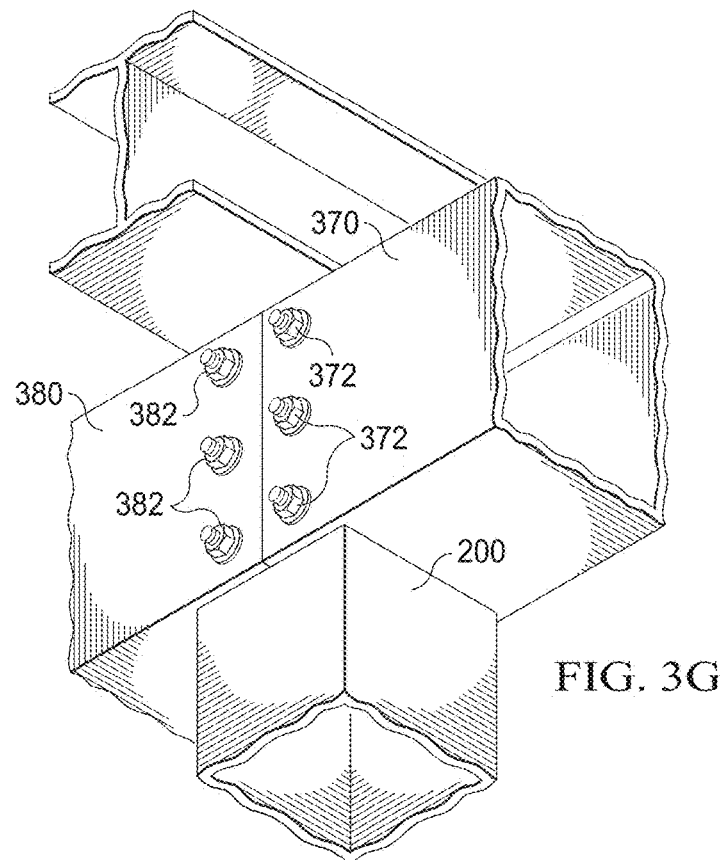
FIG. 3G shows another example of a vertical column and connected first and second beams.

In another specific embodiment, if the beam and column are positioned such that the gap 332 is relatively small, the length L may be approximately equal to one-half the outer dimension (X or Y, as the case may be) of the column/beam to which it will attach/couple, and may be less than one-half the outer dimension. In such case, making the length L of the flanges 310, 312 equal to, or slightly less than the outer dimension of the column 200 allows for an additional beam to be attached/coupled to the column 200 at the same vertical location (or horizontal location, if attached to another beam), thus allowing two beams to be attached to the column 200 at the same height (i.e. in the same horizontal plane or point). An example of this is shown in FIG. 3G. The length L may be longer, if desired. In another embodiment, the length L is substantially equal to or less than one-half the OD of the column 200. In a specific example, if the OD of the column 200 equal 6 inches, the length L is approximately three inches, and may be approximately three and one-eighth inches. This will assist in construction tolerances as there will then be a sufficient gap for clearance.

To assist in providing multiple connection points at the same location on a column 200 (or beam), the attachment holes 208, 308 and the length L of the flanges 310, 312 are configured so that the outer edges of the flanges 310, 312 extend to a point that is about equal to, or less than, about one-half the outer dimension of the column 200 (as shown in FIG. 3F), e.g., extending up to the midpoint. If only one connection is contemplated, then the flanges may extend farther than the mid-point, if desired.

The cross-section dimensions (the X outside diameter and the inner dimension) of the sidewall(s) (that include the flanges 310, 312) along the entire length of the beam 300 are substantially equal to the ID and OD between the two flanges 310 and 312. Moreover, the thickness of the sidewall 303b measured along the length of beam 300 is substantially equal to the thickness of the flange 310, and similarly, the thickness of the sidewall 303d measured along the length of beam 300 is substantially equal to the thickness of the flange 312. Further, the flanges 310 and 312 are integrally formed as part of, and unitary with, the respective sides and sidewalls 302b, 303b and 302d, 303d.

Now referring specifically to FIG. 3F, there is shown a top view of the beam 300 connected to the column 200 (or a side view of a beam connected to another beam). A mechanical fastener 330 extends through the plurality of attachments holes 308 (in the flanges of the beam 300) and attachment holes 208 (in the column 200). Typically, more than one fastener 330 is used.

The overall length of the beam 300 is generally equal to the desired beam span of the structure 100 (with some beams shorter or longer than others, as per the design). In one embodiment, the beam 300 is a single, unitary piece, with lengths ranging from ten to twenty feet. In other embodiments, beam length is between twelve and sixteen feet, greater than twelve feet, and/or up to sixteen feet, and perhaps up to even twenty feet.

Now referring to FIG. 3G, there is shown one example of the vertical column 200 having a first horizontal beam 370 and a second horizontal beam 380 connected. Beams 370, 380 are similar to the beam 300. The first beam 370 is connected at a first location along the column 200 and the second beam 370 is connected at a second location, though at the same vertical height (i.e., both the beams are in the same plane and extend in the same longitudinal direction), along the column 200. Each connection includes a set of attachment holes 372, 382 and plurality of fasteners 330 extending through the respective attachment holes 372, 382 and thus through the respective beam 370, 380 and the column 200. Other configurations are possible, and that shown in FIG. 3G is one example.

When the column 200 and the beam 300 described herein are utilized and connected in the manner provided and designed and constructed appropriately, the connection provides an anchor point that meets or exceeds the United States Occupational Safety and Health Administration (OSHA) anchor requirement of 5000 lbs. As such, utilizing a pultruded FRP 6×6 (inches) column and a pultruded FRP beam having dimension of at least 6×6 (inches) and a beam length of twelve feet or greater (and preferably up to sixteen feet), the present invention provides column spacing distance d of twelve to sixteen feet (and perhaps higher), with the beams spanning this distance d, and the connections of the column-beam provide anchor points that meet or exceed 5000 lbs.

Figure 4A:
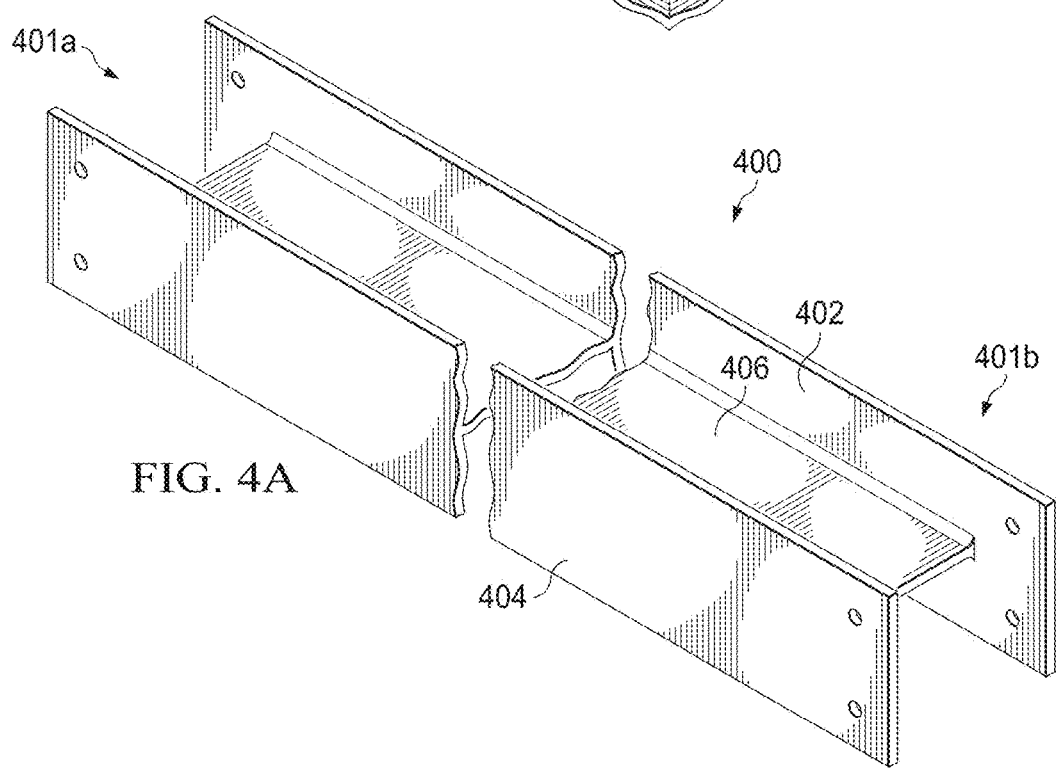
FIGS. 4A, 4B and 4C illustrate a perspective view (FIG. 4A), a detailed perspective view of one end (FIG. 4B), and a cross-sectional view (FIG. 4C) of an alternative embodiment of another beam in accordance with present disclosure.
Figure 4B:
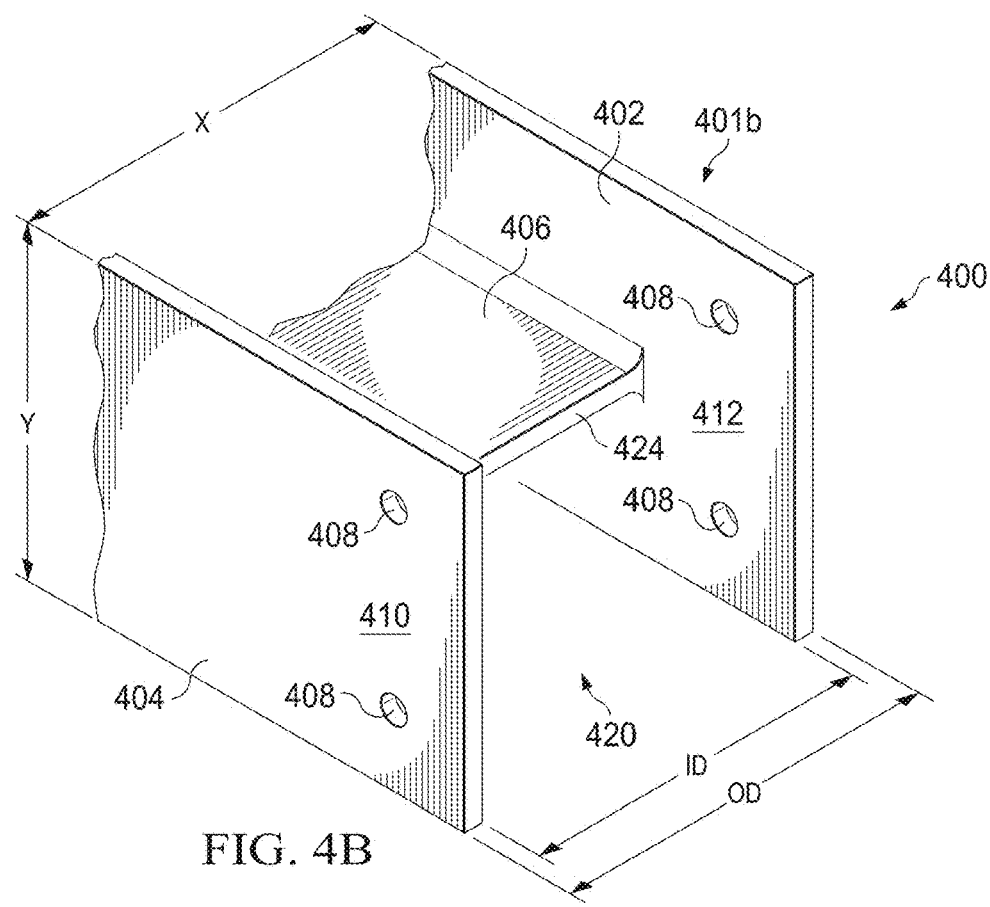
Figure 4C:
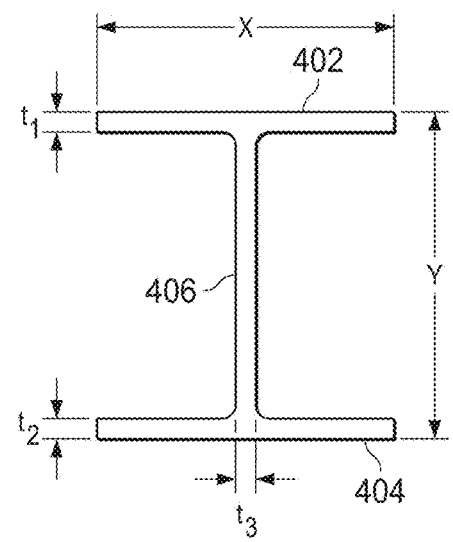

Now referring to FIGS. 4A, 4B and 4C there are shown a perspective view (FIG. 4A), a detailed perspective view of one end (FIG. 4B), and a cross-sectional view (FIG. 4C) of an alternative embodiment of the beam 300, and which is designated using the reference numeral 400, in accordance with present invention. The elongated beam 400 includes a first end 401a and a second end 401b and has generally a rectangular cross-sectional shape, and more particularly an "I" cross-sectional shape. The beam 400 includes a first sidewall 402, a second sidewall 404 and an inner wall 406. The inner wall 406 extends between and connects to the first sidewall 402 and the second sidewall 404. The overall outer dimensions are shown as dimensions X and Y (as shown in FIGS. 4B and 4C).

Now turning specifically to FIG. 4B, one of the ends 401b of the beam 400 is shown. At the end, the first sidewall 402 includes a first connection extension, tab or flange 412, and the second sidewall 404 includes a second connection extension, tab or flange 410. The extensions 410, 412 (similar to the extensions/flanges of the beam 300) extend further outward than the adjacent side of the inner wall 406 thus forming a C-shaped end for the beam 400. The distance between the inner wall of the flange 410 and the flange 412 is (similar to that described with respect to the beam 300) the inner dimension (ID) while the distance between the outer walls is the outer dimension (OD). In one specific embodiment, the beam 400 is formed with a flush end (i.e., the walls 402, 404, 406 extend the same length), and material from the areas 420 (part of the inner wall 406) is cut out or removed to form the C-shaped end, thus resulting in the formation of the extensions or flanges 410, 412.

Similar to the extensions or flanges 310, 312, the connection extensions or flanges 410, 412 provide, in essence, an integrally formed connection or mounting plate (integrally formed, as well as unitary, with the rest of the beam 400) and operable to be positioned adjacent to the sidewalls of the column 200 and mounted to the outsides of the column 200. Each of the connection extensions or flanges 410, 412 similarly provide an area that is positioned adjacent a sidewall area of the column 200.

The connection extensions 410 and 412 each include one or more attachment holes or apertures 408 and are similar to the attachment holes 308.

As illustrated in FIGS. 4B and 4C, the cross-section of the beam 400 is I-shaped (the beam 400 may include additional inner walls for additional strength, if desired). The sidewall 402 has a thickness t1, the sidewall 404 has a thickness t2 and the inner wall has a thickness t3. In one embodiment, the thickness t is substantially the same for all sidewalls (t1 equals t2 equals t3). In other embodiments, the respective thickness may vary.

The dimensions X and Y may be chosen as desired. In one specific embodiment shown in FIG. 4C, the approximate dimensions are: X=6 inches, Y=6.62 inches, t1=t2=t3=0.25 inch, resulting in the inner dimension (ID) between the flanges of approximately ID=6.12 inch (such beam is referred to as a "casing beam"). As will be appreciated, other X and Y dimensions and thickness t1, t2 and t3 may be used, as desired. In another embodiment, both X and Y are at least four inches or greater. Dimensions X and/or Y reflect the outside dimension (OD) of a given cross-section, as the case may be, of the beam 400.

As described above with respect to beams 300, one aspect of the present invention is to have the inner dimension (ID) (cross-section) between the flanges 410 and 412 of the beam 400 to be substantially equal to (or slightly larger, given construction requirements and tolerances) the outer dimension (X or Y) of the column 200.

Now referring to FIGS. 3E and 3F, though these figures are described and include reference numerals relating to the beam 300, these figures may also be referenced to show a top/side view of one end 401b of the beam 400 prior to connection to the column 200 and a top/side view after connection. As such, FIGS. 3E and 3F (and description herein) are similarly applicable to describe the functioning and attributes of the beam 400. The beam 400 is a specific embodiment (I-shaped versus rectangular shaped) of the beam 400. As such, reference is made to the description above, and the corresponding/similar parts of the beam 400 have the same or similar description, attributes, and functionality, as those parts of the beam 300 shown in the FIGURES.

Figure 4D:
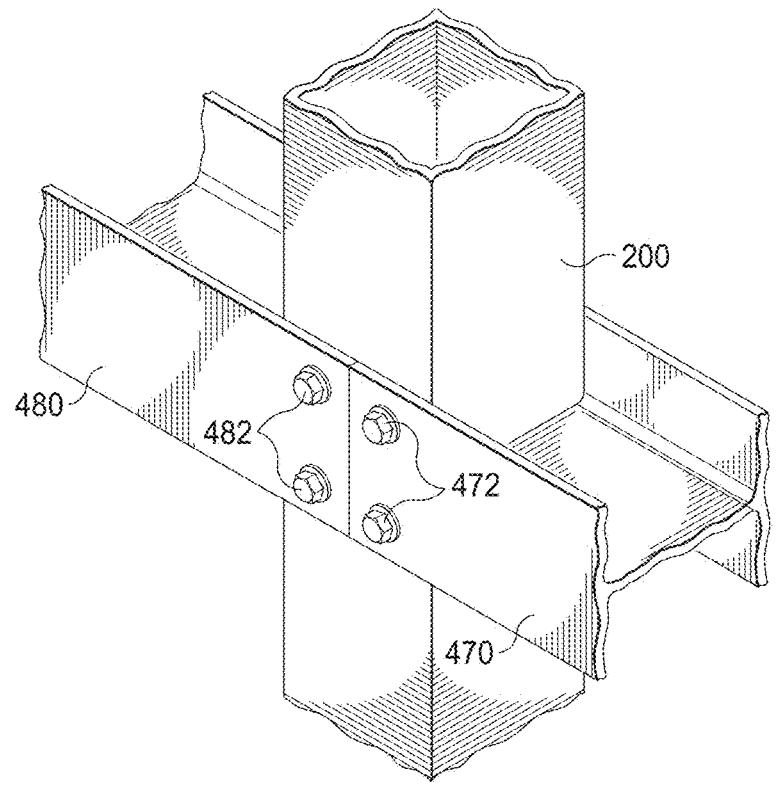
FIG. 4D shows one example of a vertical column and connected first and second beams of the alternative embodiment shown in FIGS. 4A, 4B and 4C.

Now referring to FIG. 4D, there is shown one example of the vertical column 200 having a first horizontal beam 470 and a second horizontal beam 480 connected. Beams 470, 480 are similar to the beam 400. The first beam 470 is connected at a first location along the column 200 and the second beam 470 is connected at a second location, though at the same vertical height (i.e., both the beams are in the same plane and extend in the same longitudinal direction), along the column 200. Each connection includes a set of attachment holes 472, 482 and plurality of fasteners 330 extending through the respective attachment holes 472, 482 and thus through the respective beam 470, 480 and the column 200. Other configurations are possible, and that shown in FIG. 4D is one example.

It should be noted that though the FIGURES and description generally describe columns and beams, and illustrate column-beam connections, the present invention contemplates connection of beams (beams 300, 400) to other beams.

Though not shown, the ends of the beams 300, 400 may be cut diagonal to allow for diagonal attachment to a column (or other beam). As such, the beams may also function as diagonal bracing members for bracing between columns. In particular, a beam such as the beam 400 may be particularly useful for such application.

When constructed using fiber reinforced plastic (FRP), each of the columns 200 and beams 300, 400 are unitary and integrally formed. Further, the beams 300, 400 may be utilized as beams to carry joists, or as joists themselves. Further the beams may be utilized to carry loads and may be used for other or additional purposes, such as for attachment means for outer casing materials, etc.

In a specific embodiment, the column 200 and the beam 300, 400 are made of a material containing glass fiber, or other composite or reinforcing material(s). The column 200 is made of pultruded fiber reinforced plastic (FRP) and may include some fire resistant and/or non-fire resistant materials, as will be understood by those in the art. In one embodiment, the columns and beams (and other plastic structures described herein) are constructed using brominated resin for fire retardant characteristics. Pultruded FRP structures or members are generally those produced by pulling glass fibers or mats (or other composite or reinforcing material) through a die with a resin material. Any reinforcing fiber or other materials may be used, and any type of resin material, such as polyurethane, vinylester, polyester, or other polymer materials may be used, as known to those in the art. In one embodiment, the plastic structures include carbon to increase strength, and in another embodiment, the reinforcing fiber may be defined as carbon material or other strength increasing materials.

The columns 200 and beams 300, 400 are manufactured using a typical pultrusion process (resin bath, die injection, etc.) using dies corresponding to the desired cross-sectional shape of the column or beam. As the pultruded component (column, beam, etc.) is pulled through the die and solidifies, the component is cut to length per the desired lengths, as specified herein (the components may also be cut to a standard length, and then re-cut to the needed length at a later time). Each column 200 and beam 300, 400 is integrally formed, and of unitary construction. After the columns or beams are made to the appropriate length, attachment holes are formed (as previously described herein) at the suitable locations and the end(s) of the beams are formed to create the connection extensions or flanges (as described). The system of the present invention allows for the custom design of a tower/structure 10 with components that are specially constructed that allows for quick and efficient erection of the structure at the desired site. Though a pultrusion process is disclosed, it may be possible to utilize another manufacturing process to create the composite plastic structures.

Figure 5A:
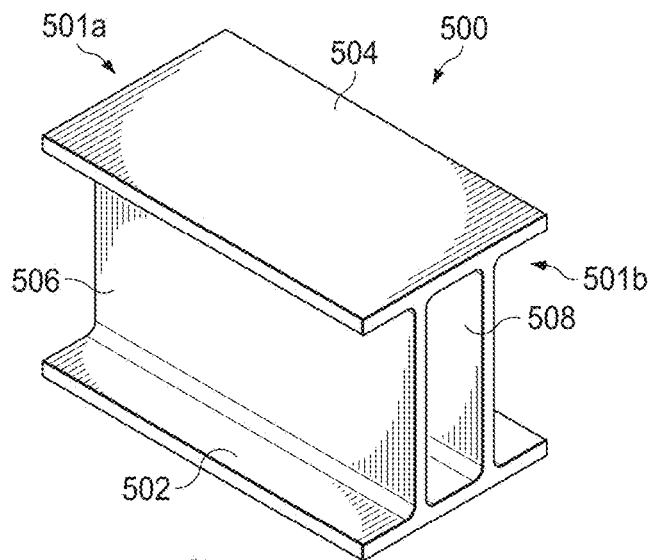
FIGS. 5A and 5B illustrate a perspective view (FIG. 5A) and a cross-sectional view (FIG. 5B) of a joist beam 500 in accordance with present disclosure.
Figure 5B:
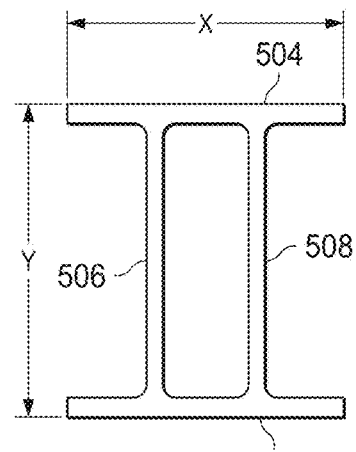

Now referring to FIGS. 5A and 5B, there are shown a perspective view (FIG. 5A) and a cross-sectional view (FIG. 5B) of a joist beam 500 in accordance with present invention. The elongated joist beam 400 includes a first end 501a and a second end 501b and has generally a double "I" cross-sectional shape. The joist 500 includes a first sidewall 502, a second sidewall 504, a first inner wall 506 and a second inner wall 508. Each of the inner walls 506, 508 extends between and connects to the first sidewall 502 and the second sidewall 504. The overall outer dimensions are shown as dimensions X and Y (as shown in FIG. 5B).

As illustrated in FIG. 5B, the cross-section of the joist 500 is double I-shaped (the joist 500 may include additional inner walls for additional strength, if desired). The sidewall 502, the sidewall 504, the first inner wall 506 and the second inner wall 508 each have at thickness, t1, t2, t3, t4, respectively (not shown). In one embodiment, the thickness t is substantially the same for all members. In other embodiments, the respective thickness may vary.

The dimensions X and Y may be chosen as desired. In one specific embodiment shown in FIG. 5B, the approximate dimensions are: X=4 inches, Y=6 inches, t1=t2=0.25 inch, and t3=t4=0.15 inch (such joist is referred to as a "heavy joist", while "lighter" joists may also be utilized, all depending on the load). As will be appreciated, other X and Y dimensions and thickness t1, t2 and t3 may be used, as desired. In another embodiment, both X and Y are at least three inches or greater. Dimensions X and/or Y reflect the outside dimension (OD) of a given cross-section, as the case may be, of the joist 500.

The joist 500 is similarly constructed and made using a pultrusion process as the beams and columns. The joist 500 is integrally formed, and of unitary construction. The joists may additionally be constructed with polyurethane and stronger reinforcement materials, to increase the strength and load carrying capabilities of the joist 500. Joists of the type typically span more than one bay.

As such, the overall length of the beam 500 is generally equal to the desired joist span, or partial span, of the structure 100 (with some joists shorter or longer than others, as per the design). In one embodiment, the beam 500 is a single, unitary piece, with lengths ranging from ten to fifty feet. In other embodiments, joist length is between fourteen and forty feet, greater than twenty feet, and/or greater than twenty-five feet.

Figure 6A:
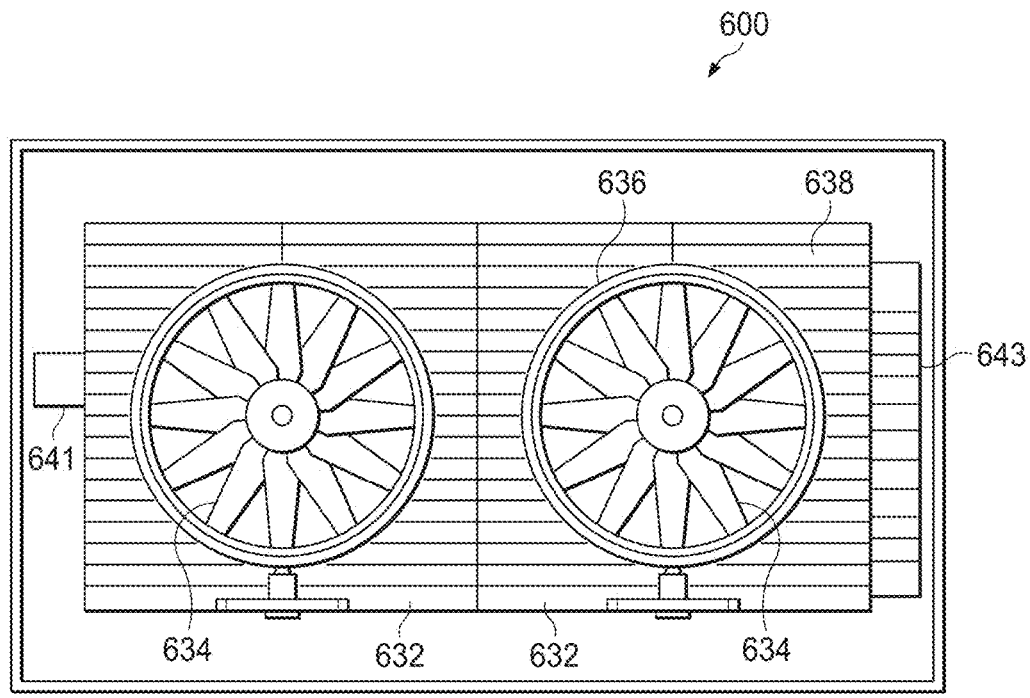
FIGS. 6A, 6B and 6C illustrate various views of a cooling tower in accordance with the present invention, and which incorporates the structure 100 and various components of the present disclosure.
Figure 6B:
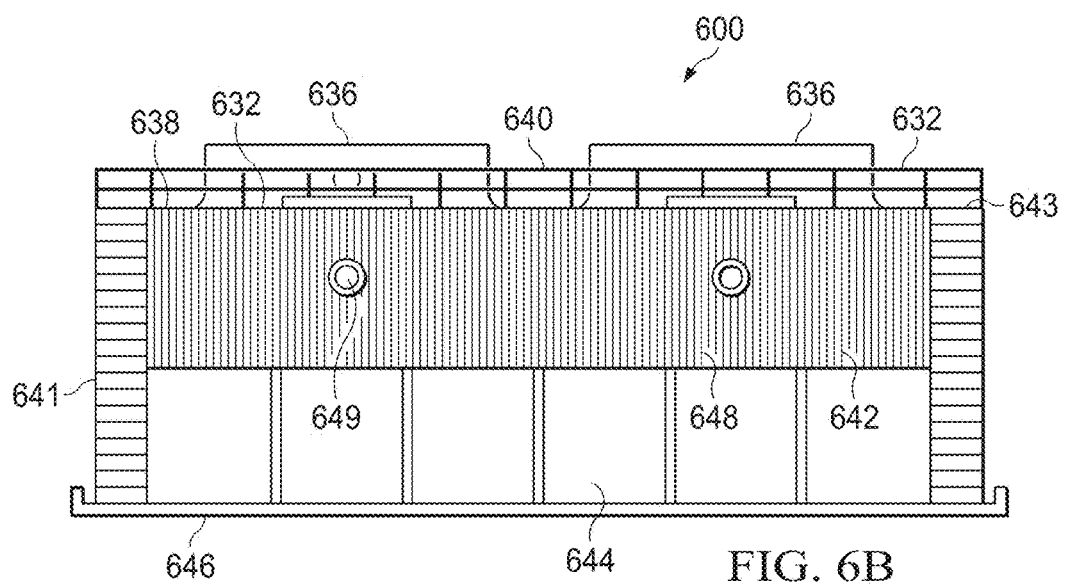
Figure 6C:
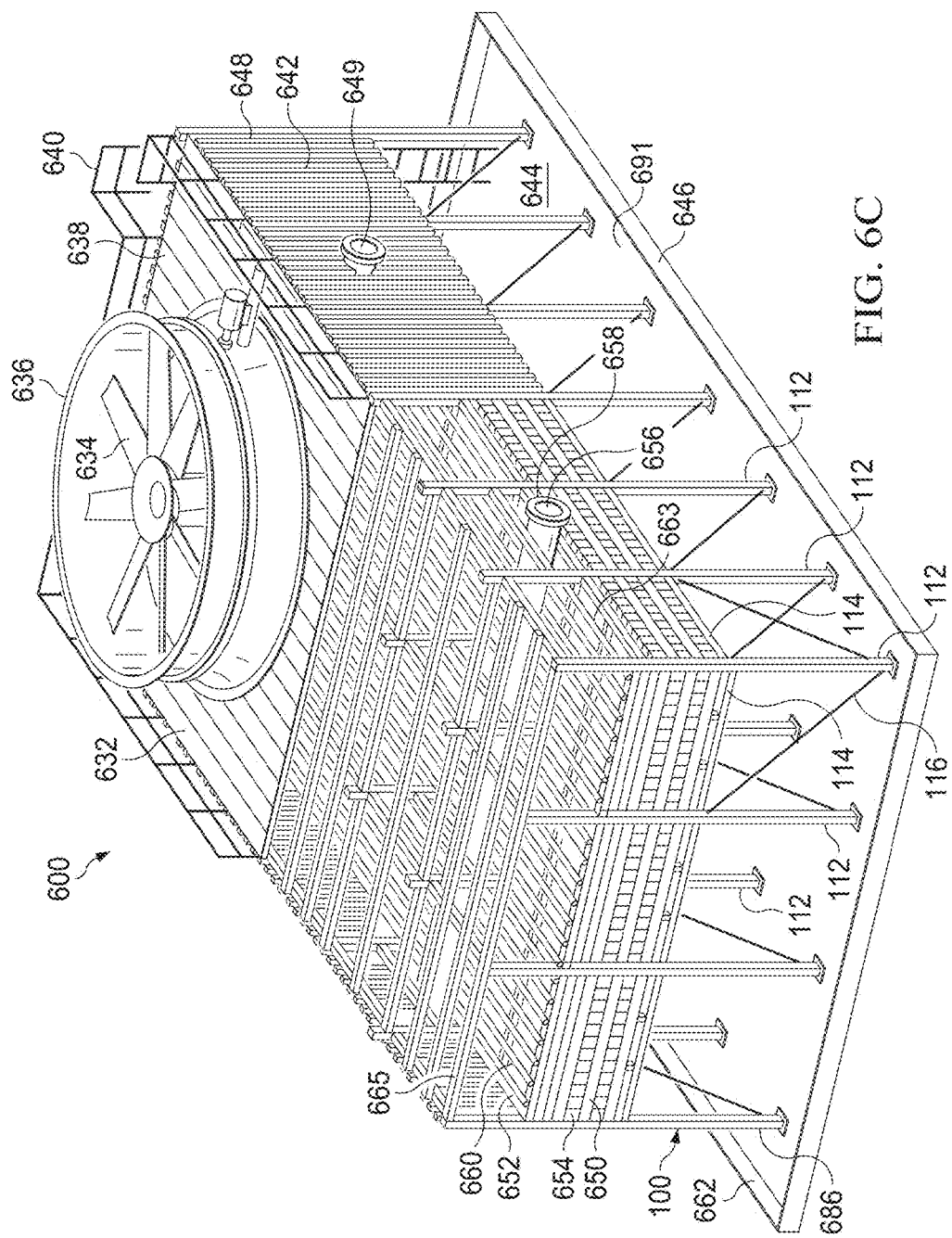

Now referring to FIGS. 6A, 6B and 6C, there are illustrated various views of a cooling tower 600 that incorporates the structure 100 and various components described herein. It will be understood that the cooling tower 600 represents an example(s) of a cooling tower in which (1) the following described new hybrid cooling tower design may be incorporated (or modified as described), and/or (2) the following described new fill material may be utilized, in accordance with the teachings of the present disclosure. In addition, use of the new hybrid cooling tower architecture and/or fill material is not limited to cooling tower as shown, and may be incorporated into other types and designs of cooling towers.

The cooling tower, generally designated by reference numeral 600 is shown with two cells 632. Each cell 632 is shown as a square about forty-two feet on each side, so its overall footprint is about forty-two by eighty-four feet. Each cell 632 is shown with nine (3×3) bays, with each bay about fourteen by fourteen feet. Other configurations are contemplated, including a single cell or multiple cells, with each cell having any number of bays (e.g., 2×2, 3×3, or uneven combinations). Each cell 632 includes a fan 634 held within a fan shroud 636 that may generally be formed of a fiber reinforced plastic structure that is assembled on top of the cooling tower 600. The fan 634 sits atop a geared fan-speed reducer which itself receives a drive shaft extending from a fan motor. The fan, fan speed reducer and motor may be mounted as conventional in the art, as for example, mounting on a beam such as a steel tube or pipe of appropriately chosen structural characteristics such as bending and shear strength and torsion resistance, or the equipment may be mounted on a beam or joist constructed of FRP. The motor and beam may be located on the roof or top of the cooling tower 600 or within it. In the illustrated embodiment, the fan shroud 636 is mounted on top of a flat deck 638 on top of the cooling tower 600 with a guard rail 640 around the perimeter. A ladder 641 or stairway 643 may also be provided for access to the deck, and walkways may also be provided on the deck.

Beneath the deck 638 are the upper levels 642 (122 in FIG. 1A) of the cooling tower 600 and beneath the upper levels 642 is the bottom or air intake level 644 (120 in FIG. 1A). Beneath the air intake level 644 is a means or mechanism for collecting cooled water from the fill system. In the illustrated embodiment, the collecting means or mechanism is a basin 646, into which cooled water drips and is collected.

The exterior of the upper levels 642 may be covered with a casing or cladding 648 designed to allow air to pass through into the cooling tower during, for example, windy conditions, and may be designed to be sacrificial, that is, to blow off when design loads are exceeded. The casing 648 may be made of fiber reinforced plastic or some other material and may comprise louvers.

As shown in FIG. 6C, the upper levels 642 include a fill level 650 and water distribution level 652. The fill level 650 is below the water distribution level 652, so that water is distributed to drip through the fill level 650 to the collecting basin 646 below. Air is moved through the fill level 650 past the water to cool it. The illustrated fan 634 comprises one possible means for causing air to move through the fill system, although other means or mechanisms may be used, such as a blower n a cross-flow arrangement.

As known in the art, the fill level 650 is filled with fill material 654 that provides a heat transfer function and media. Generally, the fill is open-celled material that allows water to pass downwardly and air to pass upwardly, with heat transfer taking place between the water and air as they pass. Open-celled clay tile or polyvinyl chloride materials or other open cell heat transfer media may be used. Various types of fill material may be used, and such fill material is commercially available. The cooling tower 600 of the present disclosure is not limited to use of any particular type of fill material. The present disclosure is also applicable to cross-flow designs.

A water distribution system 649 in the water distribution level 652 above the fill level 650 includes a distribution header 656 that receives hot water from a supply pipe (not shown) that may be connected to the inlet 658 on the exterior of the cooling tower. One distribution header 656 extends across the width of each cell, and each is connected to a plurality of lateral distribution pipes 660 extending perpendicularly from the header 656 to the opposite edges of each cell. The lateral distribution pipes 660 are spaced evenly across each bay, with lateral distribution pipes being provided in each of the fourteen by fourteen foot bays of the illustrated embodiment. Larger or smaller bays may be provided with an appropriate number and spacing of water distribution pipes provided.

Each lateral distribution pipe 660 has a plurality of downwardly directed spray nozzles 663 connected to receive hot water and spray it downward in drops onto the fill material 654, where heat exchange occurs as gravity draws the water drops down to the basin and the fan draws cool air up through the cooling tower. Each lateral distribution pipe may have, for example, ten nozzles, so there may exist eighty nozzles in each bay 662. The water distribution system 649 is shown and described for purposes of illustration only and other designs may also be utilized.

The cooling tower of the present invention also has a tower/frame structure 100 (also refer to FIG. 1A) to support the fan system, water distribution system and fill material. The structure 100 defines an interior volume 665 within which the fill material and substantial portion of the water distribution system are contained. The frame or structure 100 includes a plurality of vertical columns 112 and horizontal beams 114, as described previously. The horizontal beams 114 are attached to the columns 112 in a novel manner, as described herein to provide a rigid frame/structure with bays larger than the prior art and/or with fewer connections and/or components, thus simplifying construction and lowering the cost of building the field erected frame/structure 100, and ultimately the cooling tower 600 tower.

The cooling tower 600 further includes the collecting basin 646 that defines a base 691 on which the vertical columns 112 are mounted through footings 686. The types of footings and connections available are generally known to those in the art.

The cooling tower 600 generally includes the structure 100 (and components) generally shown in FIG. 1A.

As such, the frame/structure 100 includes a plurality of interconnected columns, beams and joists that provides a supporting structure for the other components of the cooling tower 600. Additional components and/or more detailed descriptions of these components in the cooling tower 600 are described in U.S. Pat. No. 5,902,522, which is incorporated herein by reference.

Hybrid Cooling Tower

As described and explained in the BACKGROUND section above, there exist prior art wet cooling towers with plume abatement technology which are typically referred to as "hybrid" cooling towers. For example, Cooling Tower Depot (Golden, Colo.) advertises a "CF Plume Abated Series" cooling tower, and SPX Cooling Technologies (Germany; Overland Park, Kans.) advertises a "Hybrid" cooling tower.

The Cooling Tower Depot design utilizes vertically-oriented coils (dry section) external to the tower wet section that are attached to the plenum side wall (i.e., at a height/position above the wet cooling section). This design also utilizes the single counter-flow draught fan to pull air through the side of the tower through the dry section. This cooling tower is described in Cooling Tower Depot, "Plume Abatement Series", Drawing Number A-100 (available at www.coolingtowerdepot.com), which is incorporated herein by reference.

The SPX Cooling Technologies design similarly utilizes vertically-oriented coils (dry section) external to the tower wet section that are attached to the plenum side wall (i.e., at a height/position above the wet cooling section). This design utilizes a separate fan for the dry section that is also positioned at the plenum side wall that pulls air through the side of the tower through the dry section. This cooling tower is described in SPX Cooling Technologies, "Hybrid Cooling Towers—Cooling Towers without visible plume" (available at www.spxcooling.com), which is incorporated herein by reference.

Turning to FIGS. 7A and 7B, there are shown diagrams illustrating two basic prior art plume abatement wet cooling towers. FIG. 7A shows a wet cooling tower with coils (dry section) internal to the plenum and disposed above and over the wet section. FIG. 7B shows a wet cooling tower with coils (dry section) attached to the plenum walls, disposed higher than the wet section, and oriented vertically (with respect to ground). Air flow through the coils is substantially horizontal (with respect to ground). As will be appreciated, both the Cooling Depot Tower plume abatement cooling tower and the SPX Cooling Technologies Hybrid cooling tower are configured with the coils (dry section) at or near the plenum walls and disposed above and higher than the wet section, similar to the configuration shown in FIG. 7B. In this configuration, air is drawn in through the side of the tower near its top (in the vicinity of the plenum). As will be appreciated, the liquid flowing through the coils requires pumping the liquid to the altitude of the coils.

Figure 8:
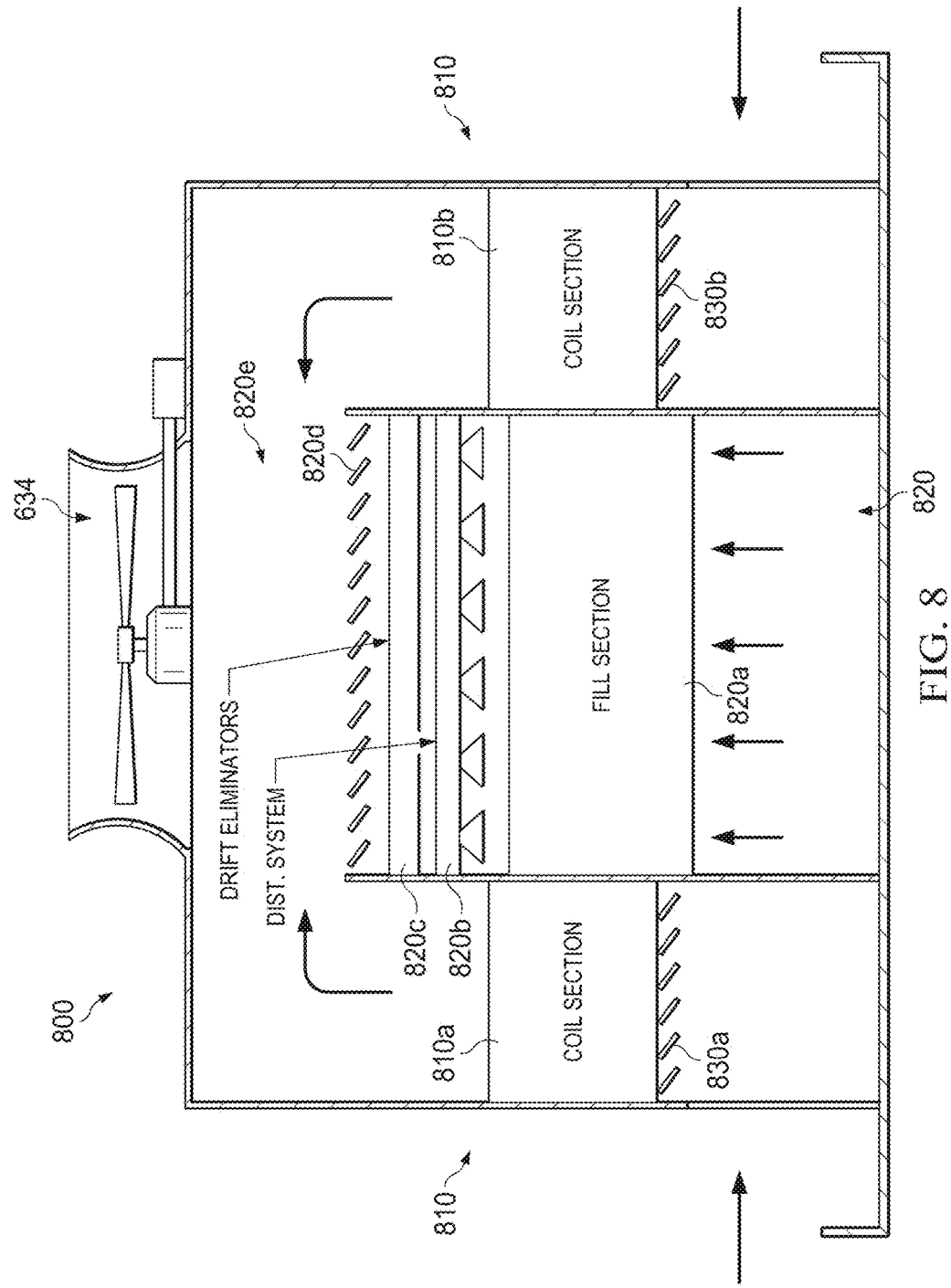
FIG. 8 illustrates a new hybrid cooling tower in accordance with the present disclosure.

Now turning to FIG. 8, there is shown a diagram of a new hybrid cooling tower 800 in accordance with the present disclosure. Two coil sections 810a, 810b (i.e., the dry section(s)) of the dry section 810 are shown positioned laterally adjacent both sides of the wet section 820 (including a fill section 820a, a distribution system 820b, drift eliminators 820c, modulating dampers 820d, and below the plenum area 820e (defined as an area above the wet section). In other words, the dry section coils 810a, 810b are disposed at about the same altitude/height level as the fill section 820a and adjacent thereto. In this embodiment, a single draft fan 634 pulls air (as shown) through the side of the tower 800 (at the conventional input location near the bottom by the basin 646) and the drawn air is divided into multiple flows. Air flows upward through the dry coil sections 810, 810a, 810b, while air also flows upward through the wet section 820—as illustrated. In the plenum 820e, the air flows combine and exhaust via the fan.

As will be appreciated, the components of the wet section 820 are similar or the same as the components described above with respect FIGS. 6A, 6B and 6C.

Further illustrated in FIG. 8 are multiple sets of dampers 830a, 830b positioned to control the amount of air flowing through each of the dry coil sections 810a, 810b and the wet section 820. These function to adjust air flow—as desired—and may be controlled manually or automatically. The dampers 820d associated with the wet section 820 may have modulators to assist in combining the air flows to effectuate plume abatement. As will be appreciated, the air flow can be controlled and directed through the wet section 820 and dry section(s) 810a, 810b in any proportion, such as (1) only through the wet section, (2) only through the dry section(s), or (3) through both the wet section and dry section(s) in any proportion (depending on damper control).

Figure 9:
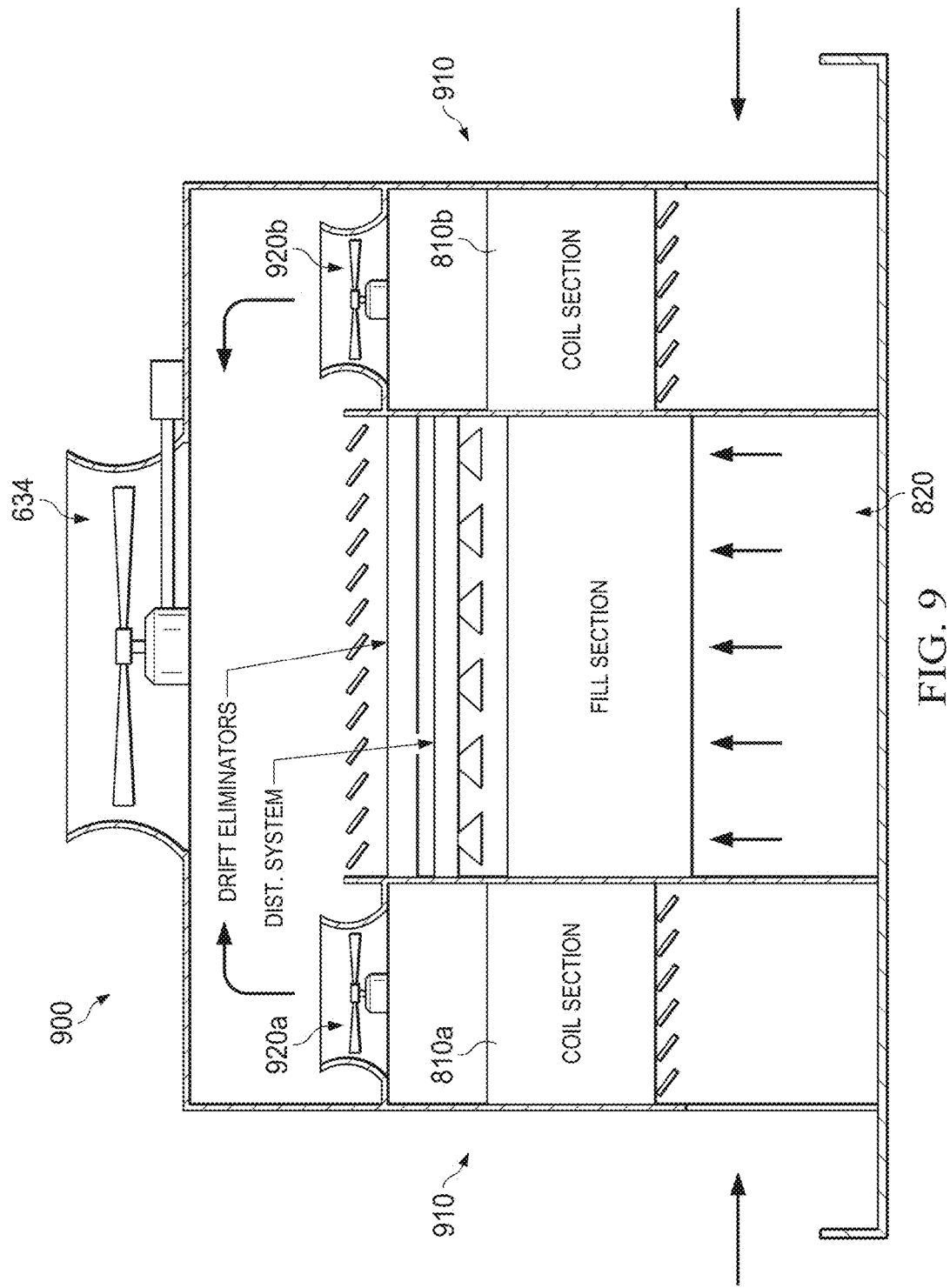
FIG. 9 illustrates another embodiment of a new hybrid cooling tower in accordance with the present disclosure.

Now turning to FIG. 9, there is illustrated another embodiment of a new hybrid cooling tower 900 in accordance with the present disclosure. This embodiment is similar to that in FIG. 8, except each of the two coil sections 810a, 810b of the dry section 910 includes one or more separate fans 920a, 920b (e.g., dry section fans) for drawing hair through the cools 810a, 810b—as shown. The additional fan(s) enable an increase in air flow capability through the dry section 910, as well providing configurability to reduce or eliminate operation of the wet section fan 634 when only the dry section 910 is selected for operation. As will be appreciated, the cooling towers 800, 900 described herein have the necessary electronics/hardware/components to enable the wet section fan and dry section fan(s) to work in combination/collectively in a manner that increases efficiency of the cooling tower. The embodiment of FIG. 9 provides, in essence, a "supercharged" wet/dry hybrid cooling tower.

As will be appreciated, the components of the wet section 820 in the tower 900 are similar or the same as the components described above with respect FIGS. 6A, 6B and 6C, except the dampers in the wet section 820 may be optional.

Both embodiments of the hybrid wet/dry cooling towers 800, 900 shown in FIGS. 8 and 9 provide numerous benefits over conventional wet cooling towers, as well as those wet cooling towers having conventional plume abatement technology. The above-described hybrid wet/dry cooling towers 800, 900 are useful in plume abatement applications. These hybrid cooling towers 800, 900 have coils (dry section) installed in a horizontal position (not vertical position) external to the wet section 820, are positioned below the upper plenum area 820e, and not attached to the plenum side wall (see FIG. 7B). By orienting the dry section coils 810a, 810b horizontally to the air flow (upward), the coils function to straighten the incoming air and reduce air recirculation—improving performance. Positioning of the coils (closer to the ground) lowers pump head requirements because of the lower static lift requirement. In the case of the embodiment of FIG. 9, this hybrid cooling tower has additional external fans 920a, 920b disposed above the dry section coils 810a, 810b to add extra cooling capacity (in the dry section, and overall) which improves performance in dry-only applications.

By positioning the dry section coils lower (and outside and adjacent to the wet section), access to and maintenance of the dry coil sections and dampers is easier. A lower profile of the overall cooling tower can be achieved because the dry section is positioned below the upper plenum (the plenum height dimension does not need to be increased to handle the dry section coils). "Free" cooling can be obtained in certain geographies during periods of cold weather (only the dry section operates and utilizes the cold ambient air flow across the coils). In addition, the described hybrid cooling towers may also be used in hot water or steam coil applications.

Figure 10:
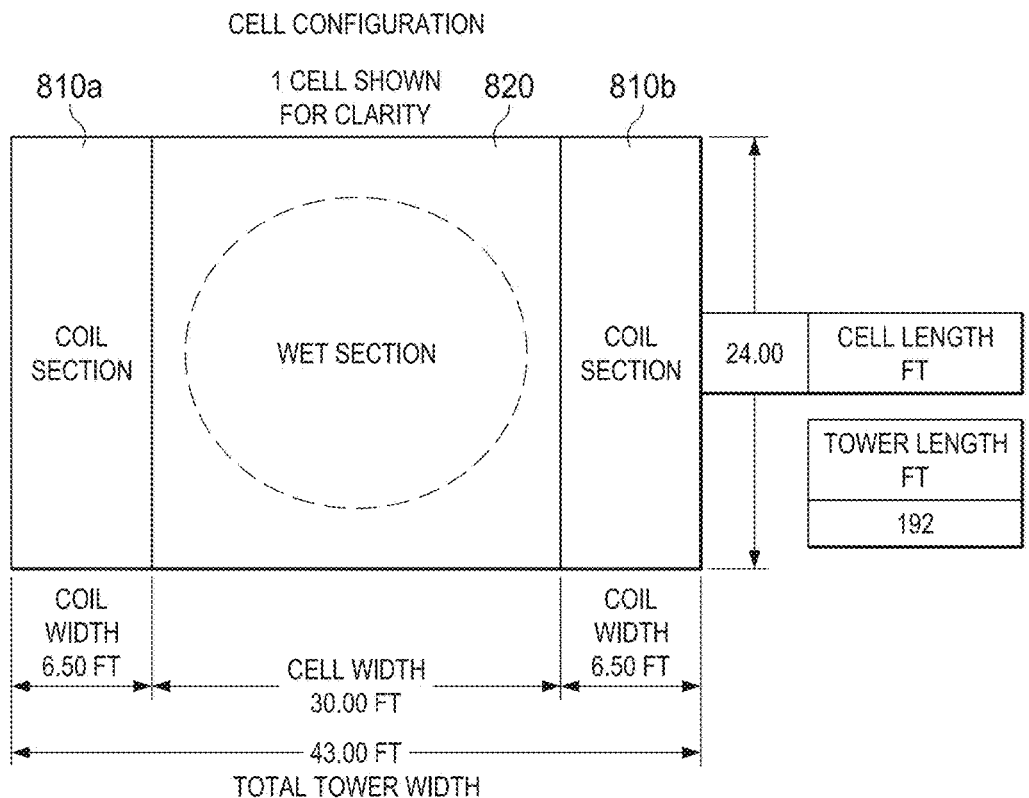
FIG. 10 is a diagram illustrating a typical footprint for a single cell of the hybrid wet/dry cooling tower(s) of FIGS. 8 and 9.

Now turning to FIG. 10, there is illustrated a typical footprint (partial top view) for a single cell of the hybrid wet/dry cooling towers 800, 900 in accordance with this disclosure. This illustrates the configuration and positional relationship of the coil sections 810a, 810b and the wet section 820. FIG. 10 is for illustration purposes only, and the dimensions and other cooling tower information shown therein is but one example. In this example, the wet section is embodies within an area 24 feet×30 feet, and the two coil sections (i.e., dry section) are positioned adjacent on opposite sides of the wet section. The coil sections are shown 6.5 feet×24 feet and configured as shown. In other embodiments, a single coil section may be utilized, as well as three or four coil sections (e.g., one large single cell may make up the entire cooling tower and may include four coil sections positioned on the four sides).

As will be appreciated, FIG. 10 illustrates a single cell of a multi-cell cooling tower. For purposes of this disclosure, reference to a "cooling tower" may refer to a single cell or multiple cells. For example, the entire cooling tower may have a total length of 192 feet and, if each cell is 24 feet in length, the entire cooling tower would have 18 cells (24× 18=192).

Figure 11A:
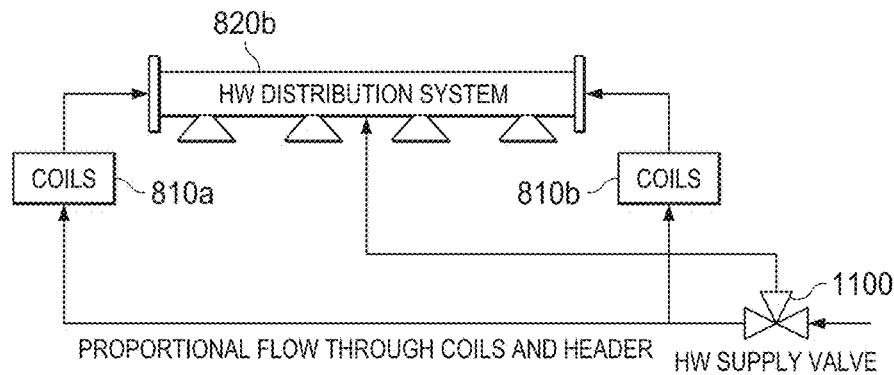
FIGS. 11A, 11B and 11C illustrate various embodiments of fluid flow configurations through the wet section (HW distribution system) and dry section (coils) that may be utilized in accordance with presently disclosed hybrid cooling towers.
Figure 11B:
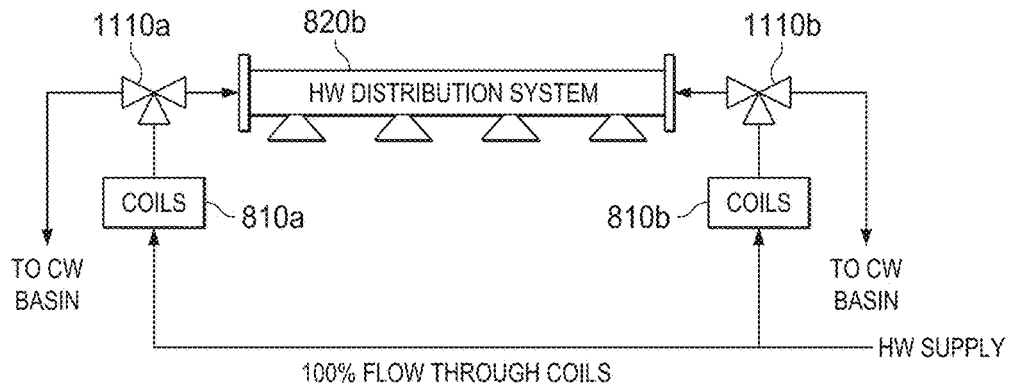
Figure 11C:
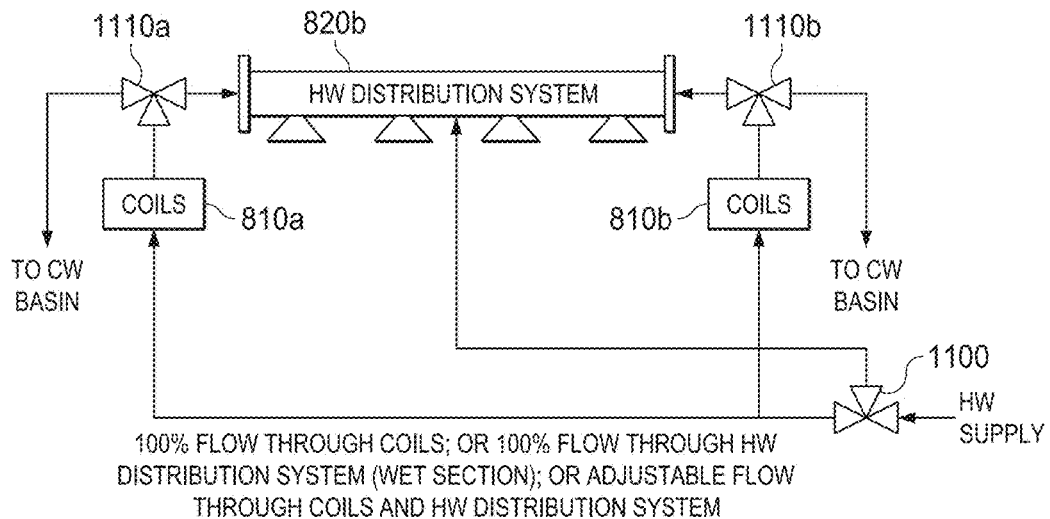

Now turning to FIGS. 11A, 11B and 11C, there are shown various embodiments of fluid flow configurations through the wet section 820 (hot water distribution system) and the dry section 810a, 810b (coils) that may be utilized in accordance with presently disclosed hybrid cooling towers 800, 900. FIG. 11A illustrates the fluid (e.g., hot water) to be cooled flows from its source through a control valve 1100 and is directed to the coils (dry section) 810a, 810b and the water distribution system 802b of the wet section 820. In this configuration, the control valve 1100 may be adjusted to selectively direct a proportional flow of fluid through the coil (dry) section 810a, 810b and the wet section 820. It will be understood that in this configuration, 100% of the fluid flows through the wet section 820 (down onto the fill material and into the basin), and any amount of fluid (0-100%) can first flow through the dry sections(s) 810a, 810b. Such configuration requires only a single proportioning control valve.

FIG. 11B illustrates that 100% of the fluid first flows through the coils (dry section) 810a, 810b and, upon exit from the coils, control valves 1110a, 1110b can be adjusted to selectively direct a proportional flow of fluid exiting the coil section(s) 810a, 810b to the wet section 820 and/or back to the collection basin. It will be understood that in this configuration, 100% of the fluid first flows through the dry section 810. The control valves 1110a, 1110b can be adjusted such that, of the fluid exiting the dry section, a selected amount (0-100%) can be directed through the wet section 820 for collection in the basin, with the other remaining amount flowing directly to the basin. In this configuration, only two proportioning control valves would be required.

FIG. 11C illustrates a combination of the fluid flow systems shown in FIGS. 11A and 11B. Fluid (to be cooled) flows from its source through a first control valve 1110 and is directed to the coils (dry section) 810a, 810b and to the HW distribution system 820b of the wet section 820. The first control valve 1110 may be adjusted to selectively direct a proportional flow of fluid through the dry section 810a, 810b and the wet section 820. A second valve 1110a and a third valve 1110b are positioned at the respective exit of the two coil sections 810a, 810b, and may be adjusted to selectively direct a proportional flow of fluid exiting the coil section(s) 810a, 810b to the wet section 820 and/or back to the collection basin. Though this configuration requires three proportional control valves, it provides more flexibility than either the first or second fluid flow systems shown in FIGS. 11A and 11B. In this fluid flow system, the fluid (to be cooled) may be directed to flow for different mode of operation: (1) dry section only mode (cooling using only the dry section); (2) wet section only mode (cooling using only the wet section); or (3) combination wet/dry mode (any combination of cooling using the dry section and wet section).

The combination wet/dry mode may include various sub-modes of operation: (a) split cooling: a portion of the fluid flows only through the wet section and another portion flows only through the dry section (e.g., the first valve 1110 determines the portion %, and the second and third valves 1110a, 1110b direct 100% of the fluid exiting the coils to the basin); (b) dry cooling and split: 100% of the fluid first flows through the dry section and a portion of this fluid is directed to flow through the wet section and another portion is directed to flow directly to the basin (e.g., the first valve 1110 directs 100% to the coils, and the second and third valves 1110a, 1110b direct a portion to the wet section and another portion to the basin), and (c) fully proportional/selectable—a portion flows directly to the wet section and another portion flows through the dry section, and a portion of the dry section fluid is directed to flow through the wet section and another portion is directed to flow directly to the basin (e.g., the first valve 1110 directs 100% to the coils, and the second and third valves 1110a, 1110b direct a portion to the wet section and another portion to the basin).

As will be appreciated, in operation, when more fluid exiting the dry section is directed directly to the basin (instead of flowing through the wet section), this saves water (less evaporation). Typically, the dry section provides in the range of 15-30% of the overall cooling capacity of the cooling tower (the wet section provides 85-70%). Thus, if the load needed for cooling falls within this range, the cooling tower could be operated in the dry cooling mode— increasing efficiency and saving water.

Figure 12:
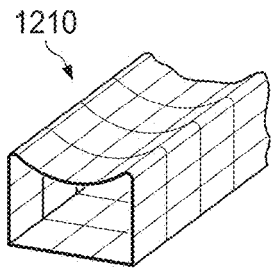
FIGS. 12(1) thru 12(9) are partial, perspective cross-sectional views of different embodiments of cooling tower splash fill material/components for use in wet cooling towers.
Figure 12:
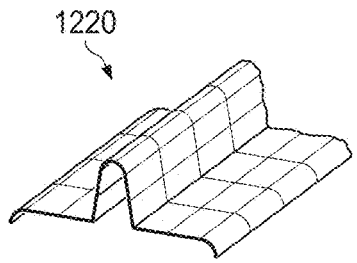
Figure 12:
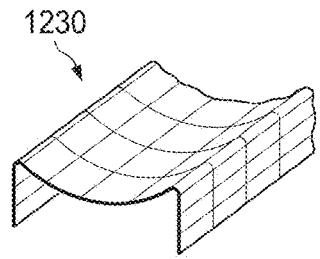
Figure 12:
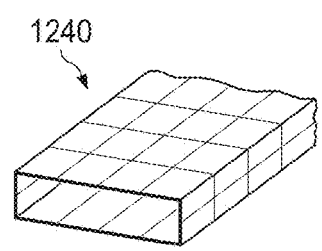
Figure 12:
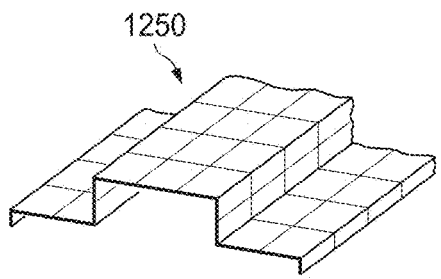
Figure 12:
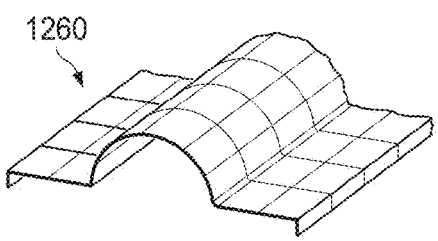
Figure 12:
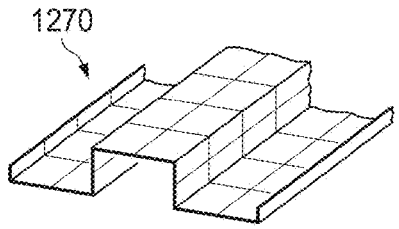
Figure 12:
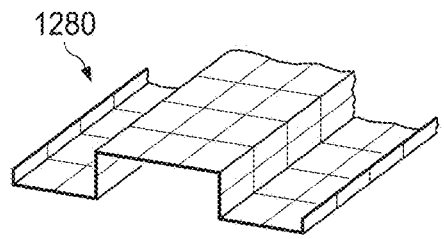
Figure 12:
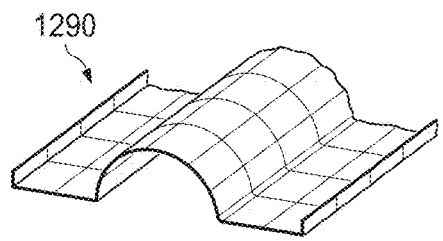

Now turning to FIGS. 12(1) thru 12(9), there are provided partial perspective and cross-sectional views illustrating various embodiments of a cooling tower splash fill material/ component for use in cooling towers having a wet section, including any conventional wet cooling towers, as well as the new hybrid wet/dry cooling towers 800, 900 (FIGS. 8 and 9) described herein. As will be appreciated, the splash fill material is constructed having any suitable length. Prior art splash fill material has various forms and shapes, including the well-known "Kelly" bar (also known as a "gullwing"). These structures are also sometimes referred to as "splash bars."

The Kelly bar is wing-shaped with a solid central ridge extending along its length, and is constructed of solid material with circular holes formed on the horizontal wings that extend from the central ridge. However, the Kelly bar is not constructed with a mesh structure/configuration and has several issues. The Kelly bar hole configurations are relatively large and do not break up the liquid into smaller droplets. Thus, the space directly below the Kelly bar is devoid of small, uniform liquid droplets—thereby reducing its efficiency. In addition, the central ridge (stem) is structurally solid and has no holes. This sheets the liquid flowing onto the lateral surface (i.e., the wings) and into the holes—which does not effectively create smaller liquid droplets, thereby further reducing its efficiency.

FIG. 12(1) illustrates a first embodiment of a splash fill material/structure 1210 in the shape of a reverse arch bar (reverse arch bar design). At least one surface is arched inward—as shown. Each of the walls is constructed in the form or configuration of a mesh (or net-like), and the top and bottom mesh grids are offset from each other (the top surface mesh is not vertically aligned with the bottom surface mesh) to increase liquid breakup. This splash fill material may be constructed of any suitable plastic material, including for example, polyvinyl chloride (PVC) and polypropylene (PP). This configuration is stronger and provides increased span capability.

FIG. 12(2) illustrates a second embodiment of a splash fill material/structure 1220 in the shape of a net wing (net wing design). This structure has a central ridge (e.g., bell-shaped) and spans extending laterally outward from the ridge—as shown. The structure is constructed in the form or configuration of a mesh (or net-like), and may be constructed of any suitable plastic material, including for example, PVC and PP. This configuration has increased liquid breakup capability as compared to the prior art Kelly bar design.

FIG. 12(3) illustrates a third embodiment of a splash fill material/structure 1230 in the shape of a reverse arch channel (reverse arch channel design) with a C-shape. The top surface is arched inward—as shown. Each of the walls is constructed in the form or configuration of a mesh (or net-like). This splash fill material may be constructed of any suitable plastic material, including for example, PVC and PP. This configuration is stronger and provides increased span capability than the prior art Kelly design.

FIG. 12(4) illustrates a fourth embodiment of a splash fill material/structure 1240 in the shape of a two-piece net bar (two-piece net bar design). Each piece (e.g., channel shape) is C-shaped to enable nesting for shipping. Each of the walls is constructed in the form or configuration of a mesh (or net-like), and when the two-pieces are structured together, the top and bottom mesh grids can be offset from each other (the top surface mesh is not vertically aligned with the bottom surface mesh) to increase liquid breakup. This splash fill material may be constructed of any suitable plastic material, including for example, PVC and PP.

FIG. 12(5) illustrates a fifth embodiment of a splash fill material/structure 1250 in the shape of a raised net beam (net beam design). The structure has a central raised beam (C-shaped) and spans extending laterally outward from the beam—as shown. Each of the walls is constructed in the form or configuration of a mesh (or net-like). This splash fill material may be constructed of any suitable plastic material, including for example, PVC and PP. This structure provides increased liquid breakup and increased strength (for increase spanning capability).

FIG. 12(6) illustrates a sixth embodiment of a splash fill material/structure 1260 in the shape of a net wave (net wave design). This structure has a central raised section (e.g., arcuate-shaped) and spans extending laterally outward from the raise section—as shown. The structure is constructed in the form or configuration of a mesh (or net-like), and may be constructed of any suitable plastic material, including for example, PVC and PP. This configuration has increased strength which increases spanning capability as compared to the prior art Kelly bar design.

FIG. 12(7) illustrates a seventh embodiment of a splash fill material/structure 1270 in the shape of a net tube (net tube design). This structure has a central tube (e.g., rectangular-shaped) and spans extending laterally outward from the tube—as shown. Each of the walls is constructed in the form or configuration of a mesh (or net-like), and the top and bottom mesh grids of the tube portion are offset from each other (the top surface mesh is not vertically aligned with the bottom surface mesh) to increase liquid breakup. The structure may be constructed of any suitable plastic material, including for example, PVC and PP. This configuration has increased liquid breakup capability and increased strength (which increases spanning capability) as compared to the prior art Kelly bar design.

FIGS. 12(8) and 12(9) illustrate eighth and ninth embodiments of a splash fill material/structure 1280, 1290 in the shape of a net ridge (net ridge design) and net wedge (net wedge design), respectively. These structures 1280, 1290 are similar to the structures 1250, 1260 shown in FIGS. 12(5) and 12(6), respectively, and have similar construction and advantages. However, these structures 1280, 1290 include outer edges having a portion vertically oriented upward—as shown. These outer edges provide for easy installation into wire grid supports. These structures may be constructed of any suitable plastic material, including for example, PVC and PP. These structures are also configured to enable nesting for shipping.

As will be appreciated, any one or more of the dampers 820d, 830a, 830b, drift eliminators 820c, control valves 1110, 1110a, 1110b, wet section fan 634 and/or dry section fans 920a, 920b (and other actuating/adjusting components within the cooling towers 800, 900) can be controlled manually or may be under electronic control. Persons of ordinary skill in the art will readily understand that any suitable electronic activation and control system (not shown) may be utilized to control these various components to direct fluid flow (control valves) and control operation of dampers and fans. Such control system may include a suitable processor/controller, memory, wireless/wired interface, sensors, etc.

It may be advantageous to set forth definitions of certain words and phrases that may be used within this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "couple" or "connect" refers to any direct or indirect connection between two or more components, unless specifically noted that a direct coupling or direct connection is present.

Although the present disclosure and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A cooling tower comprising,
a support frame structure defining a first interior volume and a second interior volume;
a fluid distribution system configured to distribute fluid within the first and second interior volumes defined by the support frame;
a wet cooling section associated with the first interior volume, the wet cooling section comprising,
heat transfer material disposed within the first interior volume defined by the support frame for receiving fluid from the fluid distribution system, and
first air moving equipment disposed above the heat transfer material and for causing air to move around the heat transfer material;
a dry cooling section associated with the second interior volume and disposed laterally adjacent the wet cooling section, the dry cooling section comprising:
coils for receiving fluid from the fluid distribution system, and
second air moving equipment comprising a fan disposed above the coils and below the first air moving equipment and for causing air to move around the coils.

2. The cooling tower in accordance with claim 1 wherein the coils comprise:
a first coil section disposed laterally adjacent a first side of the wet cooling section; and
a second coil section disposed laterally adjacent a second side of the wet cooling section.

3. The cooling tower in accordance with claim 2 wherein the fan comprises:
a first fan disposed above the first coil section and below the first air handling equipment; and
a second fan disposed above the second coil section and below the first air handling equipment.

4. The cooling tower in accordance with claim 1, further comprising:
a first damper for controlling air flow through the wet cooling section; and
a second damper for controlling air flow through the dry cooling section.

5. The cooling tower in accordance with claim 4 wherein the second damper comprises:
a third damper for controlling air flow through a first set of coils in the dry cooling section; and
a fourth damper operable for controlling air flow through a second set of coils in the dry cooling section.

6. The cooling tower in accordance with claim 5, wherein:
the first set of coils in the dry cooling section are disposed horizontally to an upward air flow; and
the second set of coils in the dry cooling section are disposed horizontally to an upward air flow.

7. A cooling tower comprising,
a support frame structure defining a first interior volume and a second interior volume;
a fluid distribution system to distribute fluid within the first and second interior volumes defined by the support frame;
a wet cooling section associated with the first interior volume, the wet cooling section comprising,
heat transfer material within the first interior volume defined by the support frame for receiving fluid from the fluid distribution system;
a dry cooling section associated with the second interior volume and disposed laterally adjacent the wet cooling section, the dry cooling section comprising,
a first set of coils disposed laterally adjacent a first side of the wet cooling section and for receiving fluid from the fluid distribution system, and
a second set of coils disposed laterally adjacent a second side of the wet cooling section and for receiving fluid from the fluid distribution system; and
air moving equipment for causing air to move around at least a one of the heat transfer material, the first set of coils and the second set of coils, the air moving equipment comprising:
a first fan disposed above the wet cooling section and the dry cooling section;
second air moving equipment disposed above at least one of the first or second sets of coils and below the first fan.

8. The cooling tower in accordance with claim 7 wherein the air moving equipment comprises a least one damper for controlling air flow.

9. The cooling tower in accordance with claim 7 wherein the second air moving equipment comprises:
a second fan disposed above the first set of coils and below the first fan; and
a third fan disposed above the second set of coils and below the first fan.

10. The cooling tower in accordance with claim 7, further comprising:
a first dry section fan disposed below the first fan for causing air to move around the first set of coils; and
a second dry section fan disposed below the first fan for causing air to move around the second set of coils.

11. The cooling tower in accordance with claim 7, further comprising:
a first damper for controlling air flow through the wet cooling section; and
a second damper for controlling air flow through the dry cooling section.

12. The cooling tower in accordance with claim 11 wherein the second damper comprises:
a third damper for controlling air flow through the first set of coils in the dry cooling section; and
a fourth damper operable for controlling air flow through the second set of coils in the dry cooling section.

13. The cooling tower in accordance with claim 7, wherein:
the first set of coils in the dry cooling section are disposed horizontally to an upward air flow; and
the second set of coils in the dry cooling section are disposed horizontally to an upward air flow.

14. The cooling tower in accordance with claim 7, wherein the fluid distribution system further comprises:
a fluid flow system comprising a plurality of control valves for controlling and distributing fluid within at least a one of the first interior volume and the second interior volume.

15. A cooling tower comprising,
a support frame structure defining a first interior volume and a second interior volume;
a fluid distribution system to distribute fluid within the first and second interior volumes defined by the support frame;
a wet cooling section associated with the first interior volume, the wet cooling section comprising, heat transfer material within the first interior volume defined by the support frame for receiving fluid from the fluid distribution system;

a dry cooling section associated with the second interior volume and disposed laterally adjacent the wet cooling section, the dry cooling section comprising, a first set of coils disposed laterally adjacent a first side of the wet cooling section and for receiving fluid from the fluid distribution system, and a second set of coils disposed laterally adjacent a second side of the wet cooling section and for receiving fluid from the fluid distribution system;

a first fan disposed above the wet cooling section and the dry cooling section for causing air to move around at least a one of the heat transfer material, the first set of coils and the second set of coils;

a first damper operable for controlling air flow through the wet cooling section; and a second damper operable for controlling air flow through the dry cooling section.

16. The cooling tower in accordance with claim 15, further comprising:

a first dry section fan disposed below the first fan and above the first set of coils, and for causing air to move around the first set of coils; and a second dry section fan disposed below the first fan and above the second set of coils, and for causing air to move around the second set of coils.

17. The cooling tower in accordance with claim 16, wherein the second damper comprises:

a third damper operable for controlling air flow through the first set of coils in the dry cooling section; and a fourth damper operable for controlling air flow through the second set of coils in the dry cooling section.

18. The cooling tower in accordance with claim 15, wherein:

the first set of coils in the dry cooling section are disposed horizontally to an upward air flow; and the second set of coils in the dry cooling section are disposed horizontally to an upward air flow.

19. The cooling tower in accordance with claim 15, wherein the fluid distribution system further comprises:

a fluid flow system comprising a plurality of control valves for controlling and distributing fluid within at least a one of the first interior volume and the second interior volume.

* * * * *